(12) United States Patent
Kashioka

(10) Patent No.: US 8,508,762 B2
(45) Date of Patent: Aug. 13, 2013

(54) IMAGE PROCESSING APPARATUS AND CONTROL METHOD FOR TEMPORARILY RELEASING A FUNCTION RESTRICTION UNDER A SET CONDITION

(75) Inventor: Atsushi Kashioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 12/725,786

(22) Filed: Mar. 17, 2010

(65) Prior Publication Data

US 2010/0259778 A1    Oct. 14, 2010

(30) Foreign Application Priority Data

Apr. 13, 2009   (JP) ................................. 2009-097392

(51) Int. Cl.
G06K 15/02    (2006.01)

(52) U.S. Cl.
USPC ........................... 358/1.14; 358/1.1; 358/1.15

(58) Field of Classification Search
USPC ................. 358/1.1, 1.9, 1.13, 1.14, 400, 401, 358/442, 1.15

See application file for complete search history.

(56) References Cited

U.S. PATENT DOCUMENTS

| 2007/0283414 A1 | 12/2007 | Sugiyama |
| 2008/0052768 A1 | 2/2008 | Tamura |
| 2008/0059962 A1* | 3/2008 | Ito .................................. 718/100 |

FOREIGN PATENT DOCUMENTS

| JP | 8-87342 A | 4/1996 |
| JP | 2005-149406 A | 6/2005 |
| JP | 2007-214700 A | 8/2007 |
| JP | 2007323324 A | 12/2007 |
| JP | 2008021245 A | 1/2008 |
| JP | 2008070944 A | 3/2008 |

* cited by examiner

*Primary Examiner* — Thomas D Lee
(74) *Attorney, Agent, or Firm* — Fitzpatrick, Cella, Harper & Scinto

(57) ABSTRACT

An image processing apparatus which imposes a usage restriction on an included function according to access control information for each user, and executes processing for a permitted user, comprises a setting unit which sets a condition required to release the usage restriction of the included function; a determination unit which determines whether or not a processing request from a user to a usage-restricted function satisfies the condition required to release the usage restriction; a generation unit which generates, when the determination unit determines that the processing request satisfies the condition required to release the usage restriction, restriction release information required to temporarily release a restriction of the usage-restricted function; and an execution unit which releases the restriction of the usage-restricted function based on the restriction release information generated by the generation unit, and executes processing by the function.

7 Claims, 23 Drawing Sheets

FIG. 7

| No. | CLIENT APPLICATION IDENTIFIER | ROLE | RESTRICTION RELEASE FUNCTION | VALID USAGE COUNT | VALIDITY PERIOD (sec) |
|---|---|---|---|---|---|
| 1 | B0A7F72-8C1F-11DD-997B... | GENERAL USER | SENDING BUTTON REGISTRATION | 2 | 15 |
| 2 | 12F475A2-8C20-11DD-9A4E... | Power USER | SMB SENDING | 1 | 60 |
| 3 | ............ | ............ | ............ | ... | ... |

FIG. 9

```xml
<?xml version="1.0" encoding="UTF-8"?>
<ACT xmlns=http://www................
......
 <Version>01.01</Version>
 <SecurityInfo>
 ......
 </SecurityInfo>
 <UserInfo>
   <UserName>UserA</UserName>
   <BaseRole>GeneralUser</BaseRole>                  } 701
   ......
 </UserInfo>                                                    702
 ......
 <DeviceAccessControl>
   <AttributeCategory Name="Application" CategoryStatus="static">
     <saml:AttributeStatement>
       <saml:Attribute Name="ApplicationId">
         <saml:AttributeValue Name="UsePossible">aaaaaaaaaaaaa</saml:AttributeValue>
         <saml:AttributeValue Name="UsePossible">bbbbbbbbbbbb</saml:AttributeValue>
         <saml:AttributeValue Name="UseImpossible">cccccccccccccccc</saml:AttributeValue>
         ......
       <saml:Attribute Name="ApplicationCategory">
         <saml:AttributeValue Name="PrintCategory">Permit</saml:AttributeValue>
         <saml:AttributeValue Name="CopyCategory">Permit</saml:AttributeValue>
         <saml:AttributeValue Name="SendCategory">Permit</saml:AttributeValue>
         ......
   </AttributeCategory>
   <AttributeCategory Name="DeviceCapability" CategoryStatus="Static">
     <saml:AttributeStatement>
       <saml:Attribute Name="Send">
         <saml:AttributeValue Name="SendFlag">Permit</saml:AttributeValue>
         <saml:AttributeValue Name="Email">Deny</saml:AttributeValue>
         ......
         <saml:AttributeValue Name="SMB">Permit</saml:AttributeValue>
         <saml:AttributeValue Name="AddressManegement">Deny</saml:AttributeValue>
         <saml:AttributeValue Name="SendNewAddress">Deny</saml:AttributeValue>
         ......
       <saml:Attribute>
     </saml:AttributeStatement>
   </AttributeCategory>                                         703
   <AttributeCategory Name="Quota" CategoryStatus="Dynamic">
     ......
   </AttributeCategory>
 </DeviceAccessControl>
</ACT>
```

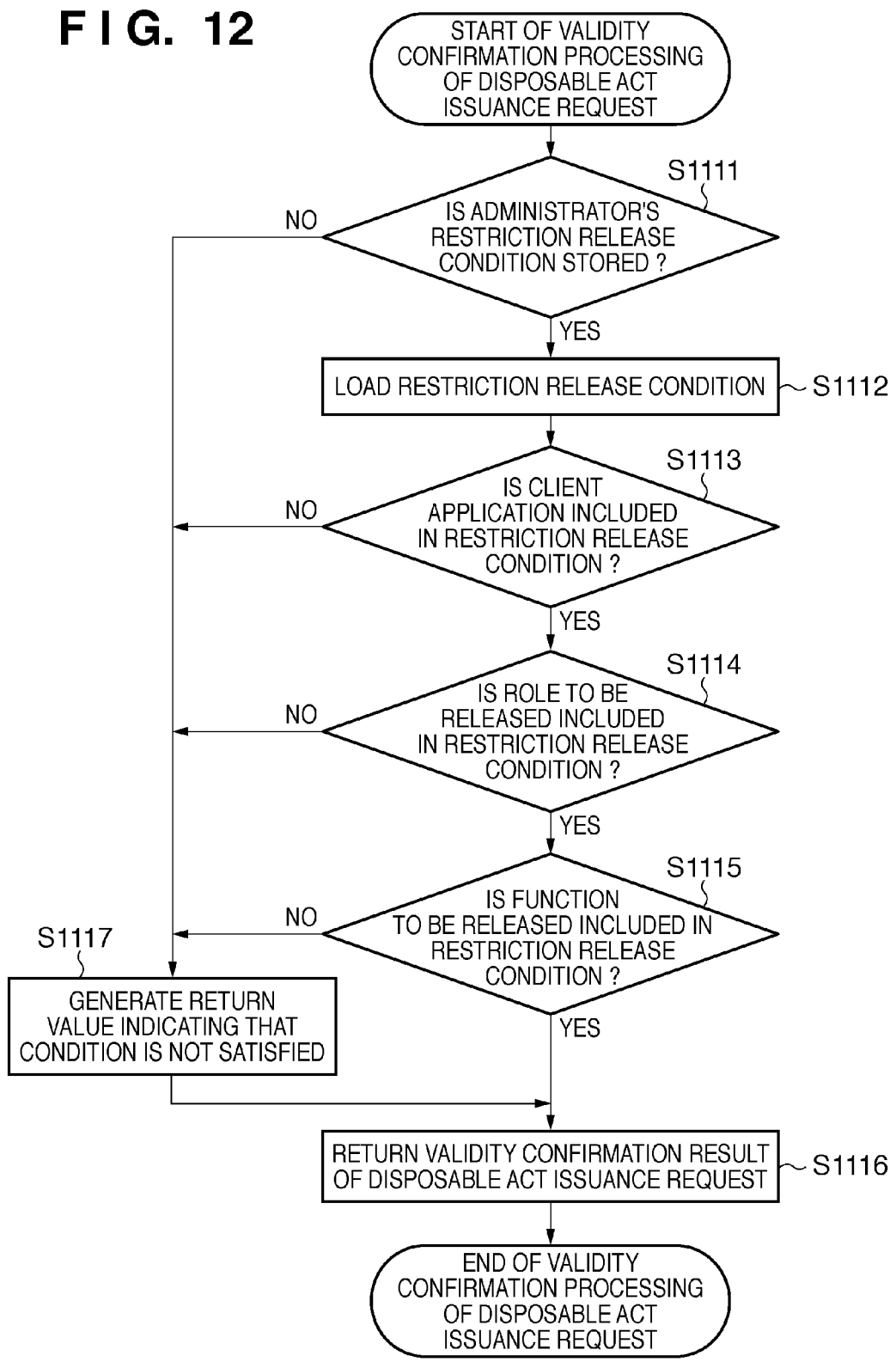

FIG. 13

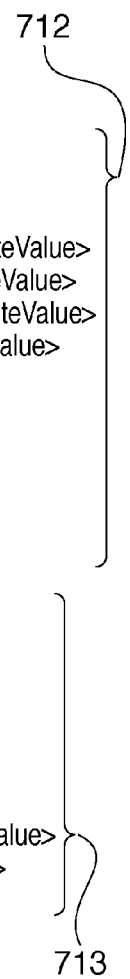

```
<?xml version="1.0" encoding="UTF-8"?>
<ACT xmlns=http://www...........
......
 <Version>01.01</Version>
 <SecurityInfo>
 ......
 </SecurityInfo>
 <UserInfo>
  <UserName>canotaro</UserName>
  <BaseRole>GeneralUser</BaseRole>
  ......
 </UserInfo>
 ......
 <DeviceAccessControl>
  <AttributeCategory Name="Application" CategoryStatus="static">
    <saml:AttributeStatement>
     <saml:Attribute Name="ApplicationId">
      <saml:AttributeValue Name="UseImpossible">aaaaaaaaaaaaa</saml:AttributeValue>
      <saml:AttributeValue Name="UseImpossible">bbbbbbbbbbbb</saml:AttributeValue>
      <saml:AttributeValue Name="UseImpossible">cccccccccccccccc</saml:AttributeValue>
      <saml:AttributeValue Name="UsePossible">xxxxxxxxxxxxxxx</saml:AttributeValue>
      ......
     <saml:Attribute Name="ApplicationCategory">
      <saml:AttributeValue Name="PrintCategory">Deny</saml:AttributeValue>
      <saml:AttributeValue Name="CopyCategory">Deny</saml:AttributeValue>
      <saml:AttributeValue Name="SendCategory">Permit</saml:AttributeValue>
      ......
  </AttributeCategory>
  <AttributeCategory Name="DeviceCapability" CategoryStatus="Static">
    <saml:AttributeStatement>
     <saml:Attribute Name="Send">
      <saml:AttributeValue Name="SendFlag">Permit</saml:AttributeValue>
      <saml:AttributeValue Name="Email">Deny</saml:AttributeValue>
      ......
      <saml:AttributeValue Name="SMB">Permit</saml:AttributeValue>
      <saml:AttributeValue Name="AddressManegement">Permit</saml:AttributeValue>
      <saml:AttributeValue Name="SendNewAddress">Deny</saml:AttributeValue>
      ......
     <saml:Attribute>
    </saml:AttributeStatement>
  </AttributeCategory>
  <AttributeCategory Name="Quota" CategoryStatus="Dynamic">
    ......
  </AttributeCategory>
 </DeviceAccessControl>
</ACT>
```

| No. | CLIENT APPLICATION IDENTIFIER | DISPOSABLE ACT | DATE & TIME OF ISSUANCE | VALIDITY PERIOD(sec) | USAGE COUNT | VALID USAGE COUNT |
|---|---|---|---|---|---|---|
| 1 | B0A7F72-8C1F-... | Sa0as033... | 2008/09/27 15:26:30 | 15 | 1 | 2 |
| 2 | 12F475A2-8C20-... | Asd0234s... | 2008/09/27 15:33:01 | 60 | 0 | 1 |
| 3 | ............ | ............ | ............ | ... | ... | ... |

F I G. 18
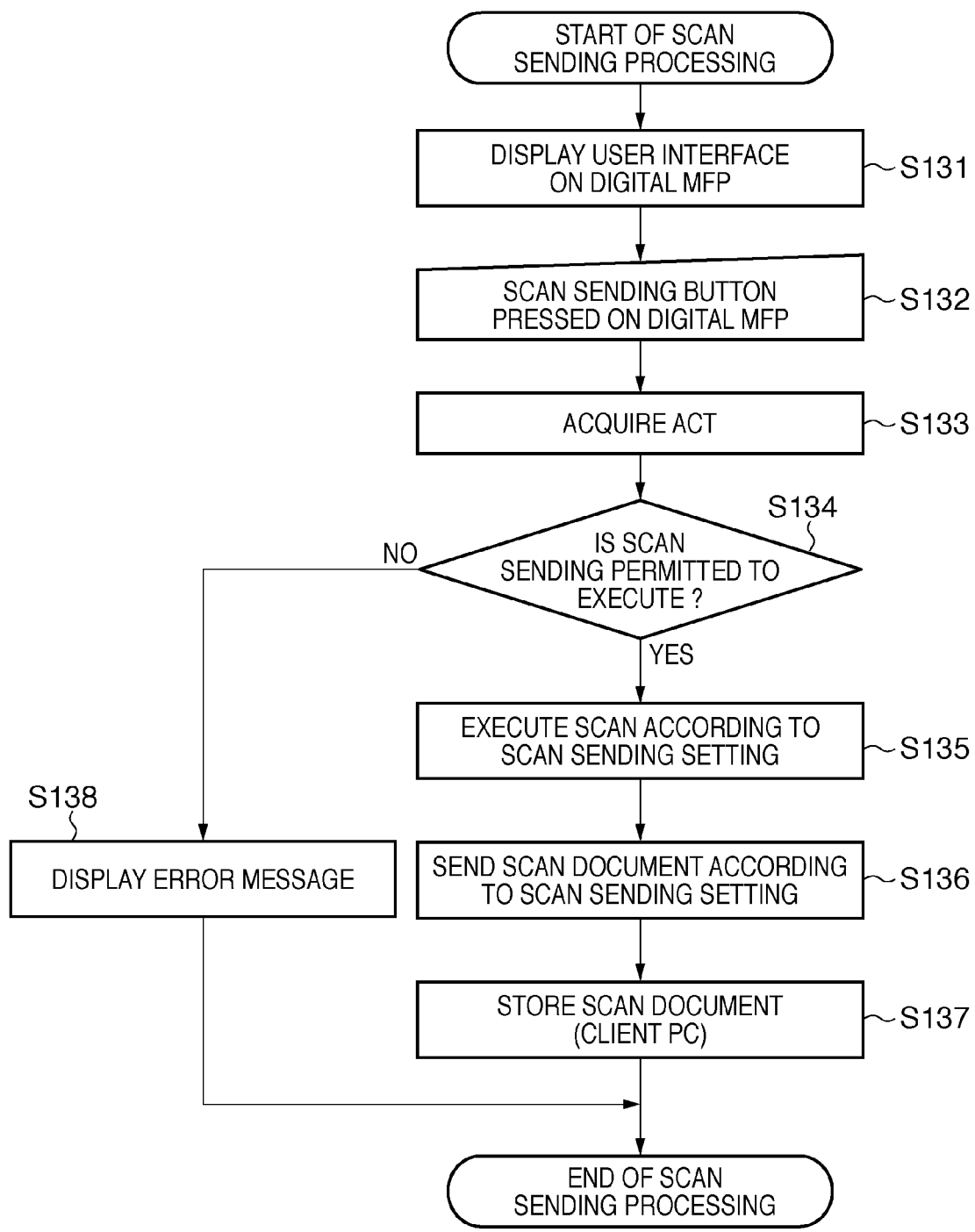

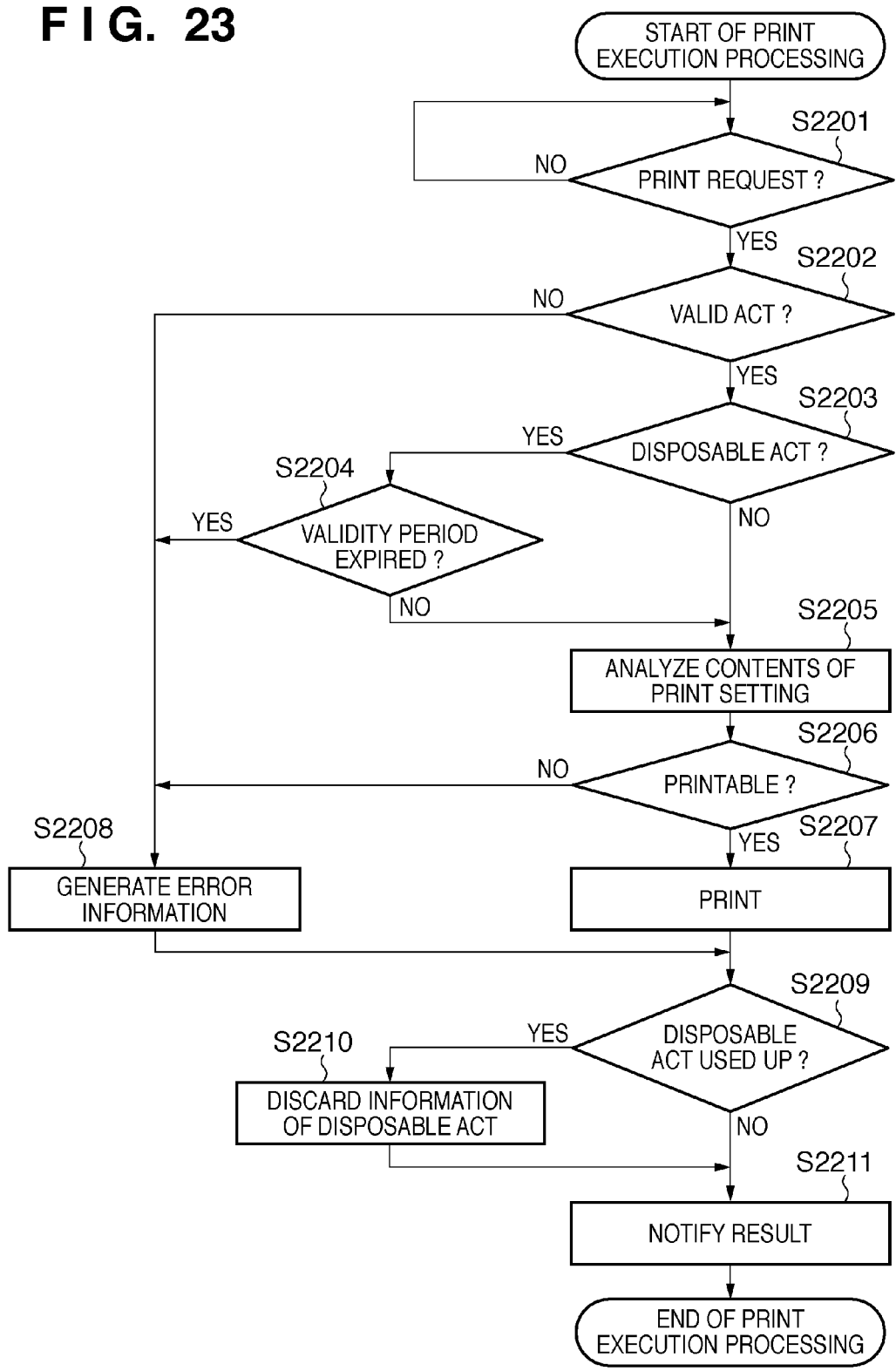
F I G. 23

IMAGE PROCESSING APPARATUS AND CONTROL METHOD FOR TEMPORARILY RELEASING A FUNCTION RESTRICTION UNDER A SET CONDITION

BACKGROUND OF THE INVENTION

1. Field of the Invention

The present invention relates to an image processing apparatus and control method, which use various functions in a digital multi-function peripheral, and, more particularly, to an image processing apparatus and control method, which flexibly control function restrictions in a digital multi-function peripheral that the user can execute so as to allow the user to execute the desired operations.

2. Description of the Related Art

Nowadays, many document management systems have been proposed. Such document management systems convert documents such as paper media in huge quantities in an office into digital data and manage them using a digital multi-function peripheral (MFP) including many functions such as a copy function, print function, FAX function, scan function, scan sending function, and storage function.

For example, external leakage of digital data obtained by scanning documents using, for example, a digital MFP increases the risk of information leakage. Also, an increase in the number of printed sheets and color print opportunities raise the cost of paper sheets and toners consumed. Hence, in order to reduce the risk and cost, a method that restricts various functions of a digital MFP for each user has been proposed. On the other hand, when many functions of the digital MFP are restricted more than necessary, general users as well as administrators can not fully utilize the digital MFP.

As a related art that solves this problem, a proposal has been made to provide a device management system that can quickly and easily change and restore an operation authority about a digital MFP, which is assigned to each user (see Japanese Patent Laid-Open No. 2007-323324). In Japanese Patent Laid-Open No. 2007-323324, a system administrator can set and apply a system policy at a desired timing, so as to restrict the operation authority of a desired user. Likewise, the system administrator can release application of the system policy on a restriction information server.

Also, a proposal has been made in consideration of the operational cost of a printing apparatus that gives an exceptional processing authority to each user who is subject to a restriction of, for example, printing without making any exceptional settings, while preventing the user from executing print processing without restriction. (see Japanese Patent Laid-Open No. 2008-021245). In Japanese Patent Laid-Open No. 2008-021245, a target document includes approval information (signature) of an approver, and restriction information based on approved user information is acquired, thereby giving an exceptional processing authority.

Also, the following proposal has been made (see Japanese Patent Laid-Open No. 2008-070944). In this proposal, data associated with print function restrictions for each user is stored, and when the user wants to perform printing using a restricted function, he or she temporarily sends a restriction release request to the administrator. Upon reception of the request, the administrator sets whether or not to release the restriction, thereby temporarily releasing the restriction. In Japanese Patent Laid-Open No. 2008-070944, the administrator issues a function restriction release code when he or she release the restriction, and the user temporarily releases the restriction using the code and can make a desired operation.

However, the aforementioned related arts suffer the following problems.

In Japanese Patent Laid-Open No. 2007-323324, since the administrator remotely performs processing to release an access restriction and restore the original settings at desired timings with respect to the restriction information server, the administrator's troublesome operations are not reduced.

In Japanese Patent Laid-Open No. 2008-021245, the approver has to put a signature on a document, and that document allows everyone to perform printing. A security problem tends to occur in addition to the approver's troublesome operation.

In Japanese Patent Laid-Open No. 2008-070944, since the administrator issues a release code upon reception from a user's request, the load on the administrator is not reduced like in Japanese Patent Laid-Open No. 2007-323324.

SUMMARY OF THE INVENTION

The present invention has been made to solve the aforementioned problems, and provides the following image processing apparatus. This image processing apparatus allows the user to temporarily release a restriction of a desired function and to use that function under a set condition when that user wants to implement the function using a digital MFP. Thus, functions available for the user are restricted, and the troublesome operations of the administrator can be reduced. In addition, a general user can sufficiently use the functions of the digital MFP without recognizing settings associated with the function restriction of the digital MFP.

According to an aspect of the present invention, there is provided an image processing apparatus which imposes a usage restriction on an included function according to access control information for each user, and executes processing for a permitted user, comprising: a setting unit which sets a condition required to release the usage restriction of the included function; a determination unit which determines whether or not a processing request from a user to a usage-restricted function satisfies the condition required to release the usage restriction; a generation unit which generates, when the determination unit determines that the processing request satisfies the condition required to release the usage restriction, restriction release information required to temporarily release a restriction of the usage-restricted function; an execution unit which releases the restriction of the usage-restricted function based on the restriction release information generated by the generation unit, and executes processing by the function; and a discarding unit which discards the restriction release information based on a discarding condition of the restriction release information after the execution unit executes the processing.

According to the present invention, a restriction of a desired function is temporarily released and uses that function under a set condition when the user wants to implement the function using a digital MFP. Thus, functions available for the user are restricted, and the operations by the administrator can be reduced. In addition, a general user can sufficiently use the functions of the digital MFP without recognizing settings associated with the function restriction of the digital MFP.

Further features of the present invention will become apparent from the following description of exemplary embodiments (with reference to the attached drawings).

BRIEF DESCRIPTION OF THE DRAWINGS

FIG. 7 is a table showing an example of restriction release conditions registered in a device application of the device control system according to the first embodiment of the present invention;

FIG. 9 is a view showing an example of an ACT issued by an image processing apparatus of the device control system according to the first embodiment of the present invention;

FIG. 12 is a flowchart showing the sequence of confirmation processing of validity of a disposable ACT issuance request in an operation button management unit of the device control system according to the first embodiment of the present invention;

FIG. 13 is a view showing an example of a disposable ACT issued by the digital MFP of the device control system according to the first embodiment of the present invention;

FIG. 14 is a table showing an example of disposable ACT management information of the device control system according to the first embodiment of the present invention;

FIG. 18 is a flowchart showing the sequence of scan sending processing of the device control system according to the first embodiment of the present invention;

FIG. 23 is a flowchart showing the sequence of print processing in an image processing apparatus of the device control system according to the second embodiment of the present invention.

DESCRIPTION OF THE EMBODIMENTS

The best mode for carrying out the present invention will be described hereinafter with reference to the drawings. The first embodiment of the present invention will be described below with reference to FIGS. 1 to 18. Note that in this embodiment, some roles set with access control information are prepared for respective functions, and a role is assigned to the user. When the user logins to a device, an Access Control Token (ACT) according to the assigned role is issued. Usage of various functions by the user are restricted according to function restrictions defined in the issued ACT, and the user executes only permitted functions.

First Embodiment

[System Arrangement]

Figure 1:
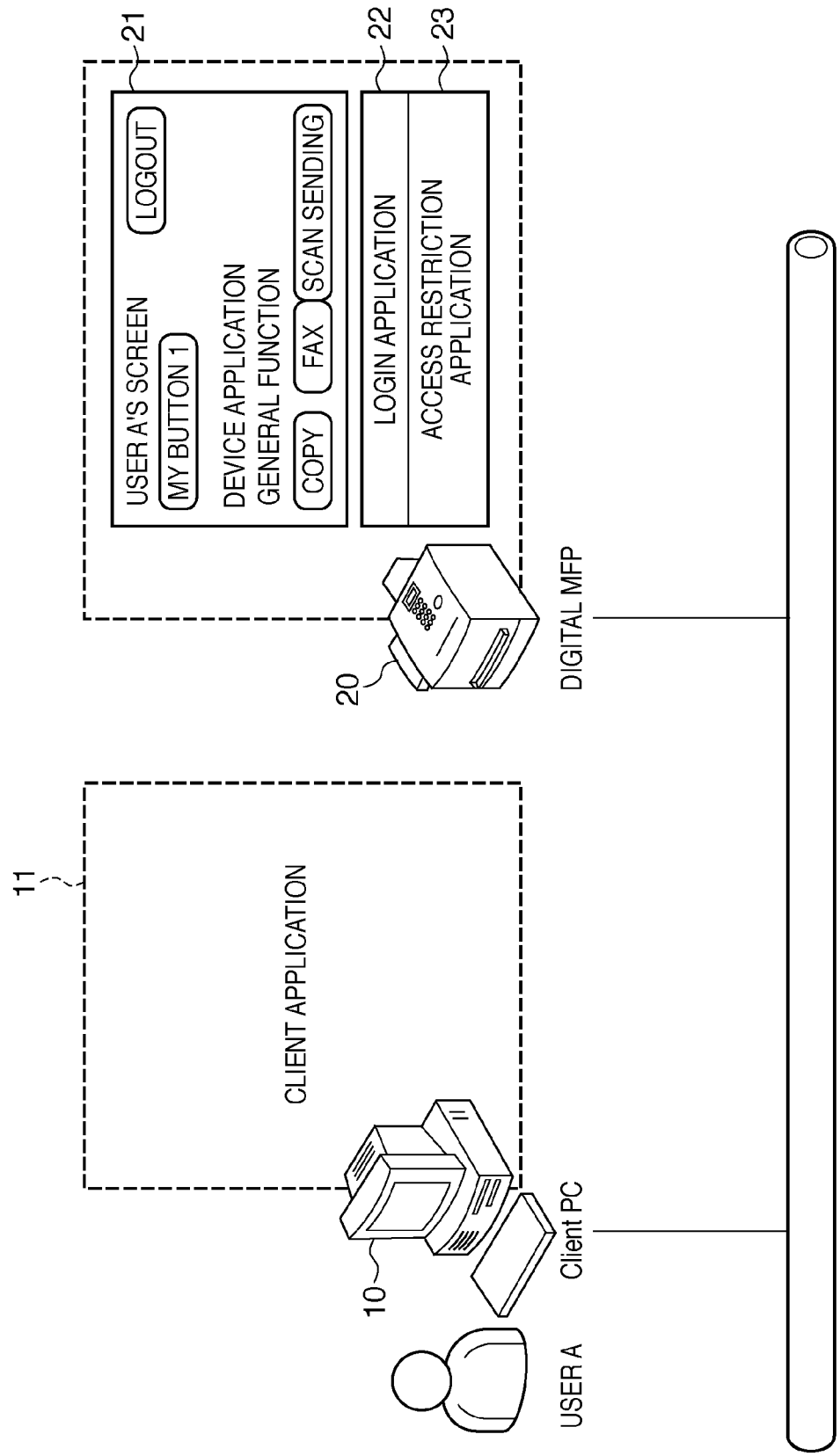
FIG. 1 is a system conceptual diagram of a device control system according to the first embodiment of the present invention.

FIG. 1 is a system conceptual diagram showing the arrangement of a device control system according to the embodiment of the present invention. In a device control system according to this embodiment, a Client PC 10 installed with a dedicated client application 11 and a digital multi-function peripheral (MFP) 20 having copy, print, scanner, and FAX function are connected via a network. User A accesses this system via the dedicated client application. In the configuration of the device control system according to this embodiment, user A accesses the system via the dedicated client application 11. In another configuration, a browser (not shown) may be installed in the Client PC 10, and user A may operate that browser. In this case, the device control system according to this embodiment may be built on a Web application server (not shown), and may communicate with the browser. However, the method of accessing the device control system proposed in this embodiment is not limited to such specific methods, and the methods described in this embodiment are examples.

Furthermore, the digital MFP 20 includes a device application 21 required to use the functions of the digital MFP 20, a login application 22 required to perform user management in the digital MFP 20, and an access restriction application 23 required to manage access restrictions to the functions of the digital MFP 20. Note that this embodiment will explain a case in which the device application 21 is an application that controls a scan sending function of the digital MFP 20. However, the present invention is not limited to this, and the device application 21 may control the functions other than the scan sending function. In the following description, the device control system according to this embodiment uses the digital MFP 20 as an image processing apparatus. However, the present invention is not limited to this and, for example, an image processing apparatus such as a consumer scanner may be used.

[Hardware Arrangement]

Figure 2:
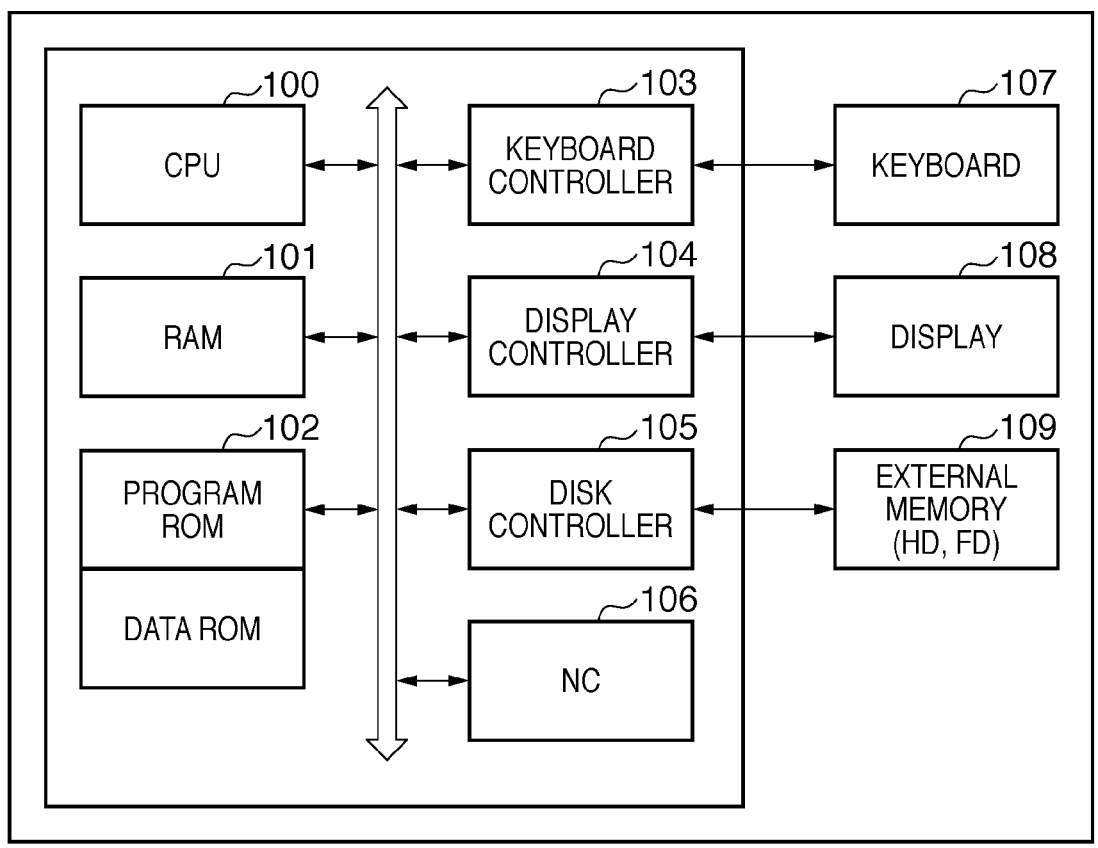
FIG. 2 is a block diagram showing the hardware arrangement of a PC in the device control system according to the first embodiment of the present invention.

FIG. 2 is a block diagram showing the hardware arrangement of each PC which configures the device control system according to the embodiment of the present invention. The Client PC 10 shown in FIG. 1 corresponds to the PC shown in FIG. 2. The hardware arrangement shown in FIG. 2 corresponds to that of a general information processing apparatus, and the hardware arrangement of the general information processing apparatus can be applied to each PC of this embodiment.

Referring to FIG. 2, a CPU 100 executes programs such as an OS and applications which are stored in a program ROM in a ROM 102 or which are loaded from an external memory 109 onto a RAM 101. Note that the OS is short for an Operating System that runs on a computer, and the operating system will be abbreviated as an OS hereinafter. The processes of respective flowcharts to be described later can be implemented by executing this program. The RAM 101 serves as a main memory, work area, and the like of the CPU 100. A keyboard controller 103 controls key inputs from a keyboard 107 and pointing device (not shown). A display controller 104 controls a display on various displays 108. A disk controller 105 controls data accesses to a hard disk (HD) and Floppy® disk (FD) as an external memory 109 that stores various data. An NC 106 is connected to a network, and executes communication control processing with other devices connected to the network.

Figure 3:
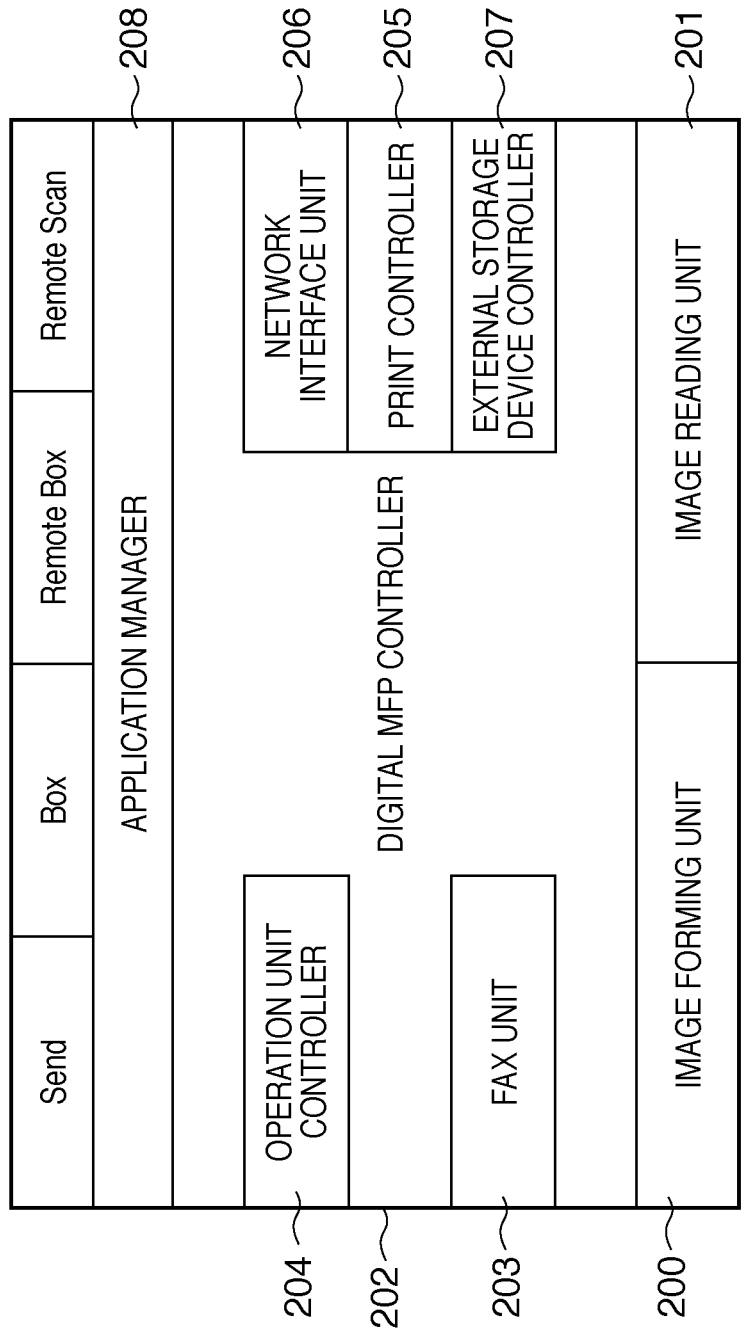
FIG. 3 is a block diagram showing the hardware arrangement of a digital MFP in the device control system according to the first embodiment of the present invention.

FIG. 3 hierarchically shows the arrangement of the digital MFP in the embodiment of the present invention. Referring to FIG. 3, an image forming unit 200 executes a series of image forming processes such as paper handling, image transfer, and fixing, and forms an image on a printing medium such as a printing sheet. This image forming unit 200 includes an ink-jet printer or an electrophotographic image forming unit. Reference numeral 201 denotes an image reading unit including, for example, a scanner. The image reading unit 201 optically reads a document image, and converts it into digital image information. Then, the image reading unit 201 outputs the digital image information to the image forming unit 200 to form an image. Or the image reading unit 201 passes the digital image information to a FAX unit 203 or network interface unit 206 to externally transmit that information via a line.

A digital MFP controller 202 controls the operations of the image forming unit 200 and image reading unit 201, and controls, for example, the image forming unit 200 to copy document information read by the image reading unit 201. The digital MFP controller 202 includes a network interface unit 206, print controller 205, FAX unit 203, and operation unit controller 204, and also controls exchanges of information among these units. The FAX unit 203 can execute processing for transmitting and receiving a FAX image, for example, transmitting digital image information read by the image reading unit 201, and decoding a received FAX signal and recording the decoded FAX image using the image forming unit 200. The operation unit controller 204 controls to transmit a signal according to an operation by the user who uses an operation panel of an operation unit, and controls a display unit as the operation unit to display various data, messages, and the like. The print controller 205 controls to process print data input via, for example, the network interface unit 206, and to output the processed print data to the image forming unit 200 so as to print an image. The network interface unit 206 controls exchange of data with other communication terminals via a communication line.

An external storage device controller 207 can control to convert an image read by the image reading unit 201 into a data format that allows the image forming unit 200 to store the converted data in an external storage device, and to store the converted data in the external storage device. Also, the external storage device controller 207 can read out stored data, execute print processing of the readout data via the image forming unit 200, and transmit the readout data onto an external network via the network interface unit 206. An application manager 208 manages a copy application, scan application, scan sending application, and the like. The application manager 208 controls the respective applications by receiving a launch, quit, install, and uninstall instructions of these applications, and receiving device information generated by the digital MFP controller 202.

[Software Configuration]

Figure 4:
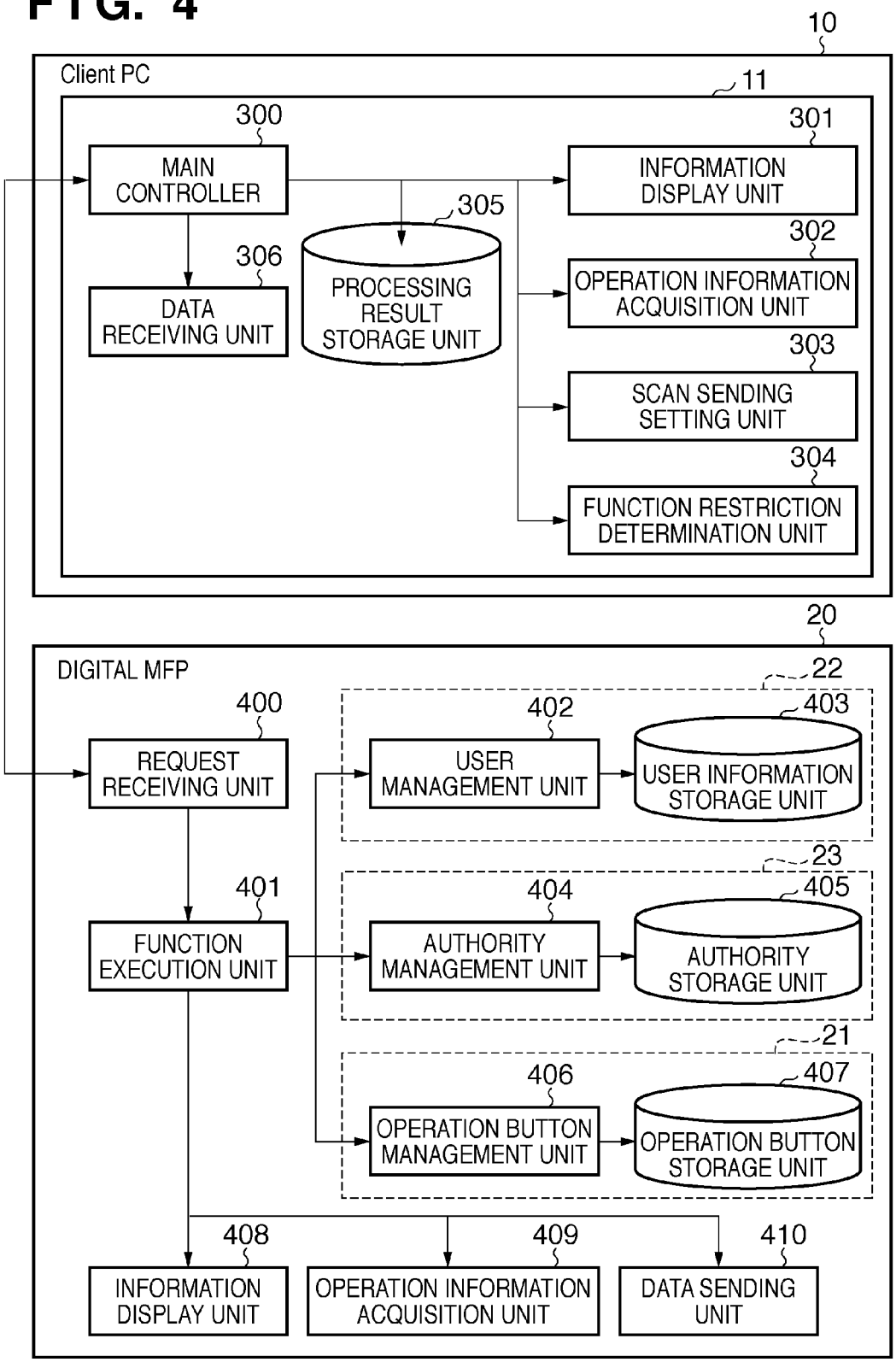
FIG. 4 is a block diagram showing the software configuration as an example of the device control system according to the first embodiment of the present invention.

FIG. 4 is a block diagram showing the software configuration as an example of the device control system according to the embodiment of the present invention, for example, FIG. 4 shows the software configuration in the Client PC 10 and digital MFP 20. The software configuration in the Client PC 10 will be described first. A main controller 300 controls the client application 11 of the device control system according to the embodiment of the present invention, issues instructions to respective units to be described below, and manages the respective units. An information display unit 301 displays a user interface of the client application 11 on the Client PC 10 according to an instruction from the main controller 300.

Figure 5:
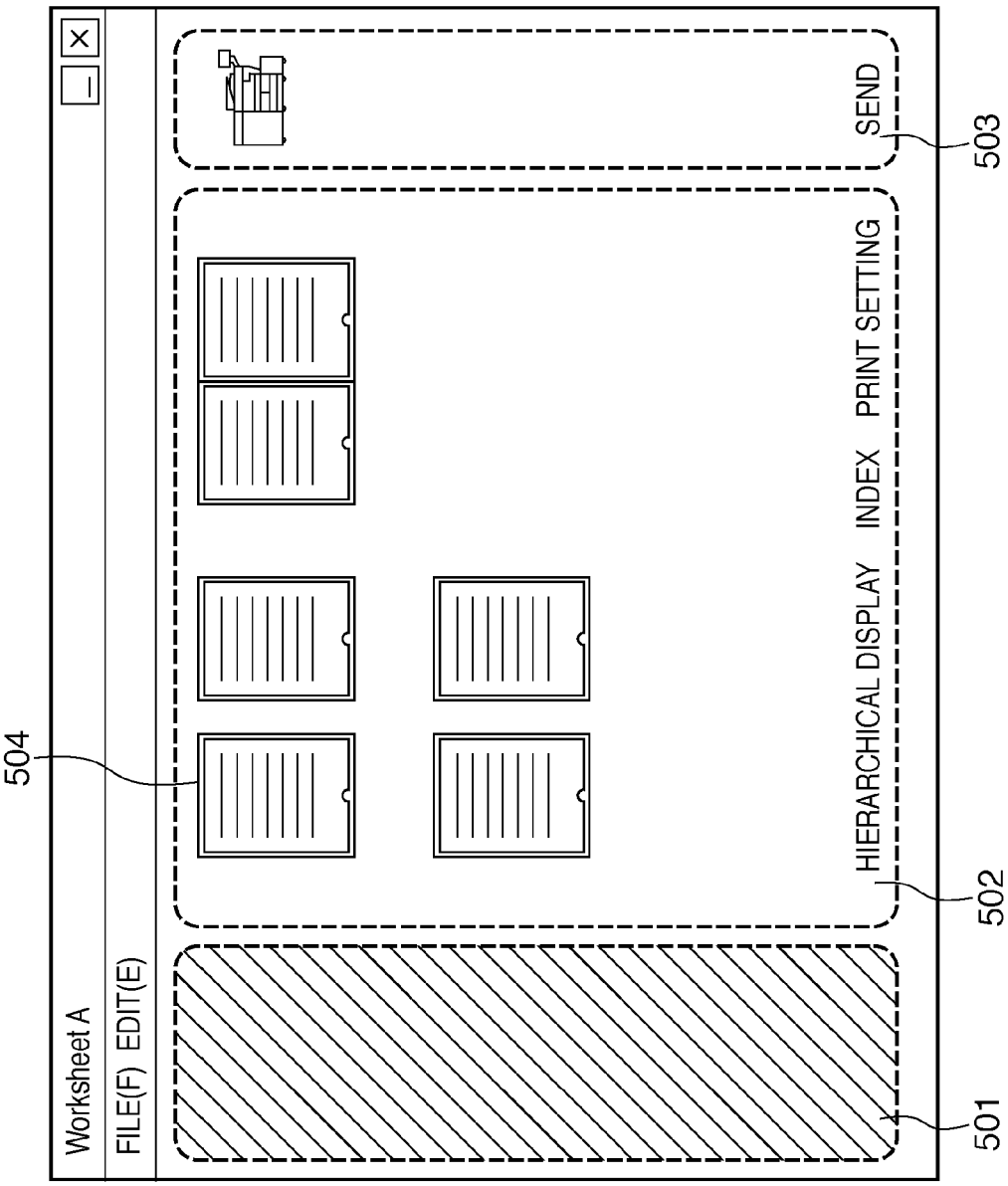
FIG. 5 is a view showing an example of a user interface of a client application of the device control system according to the first embodiment of the present invention.
Figure 17:
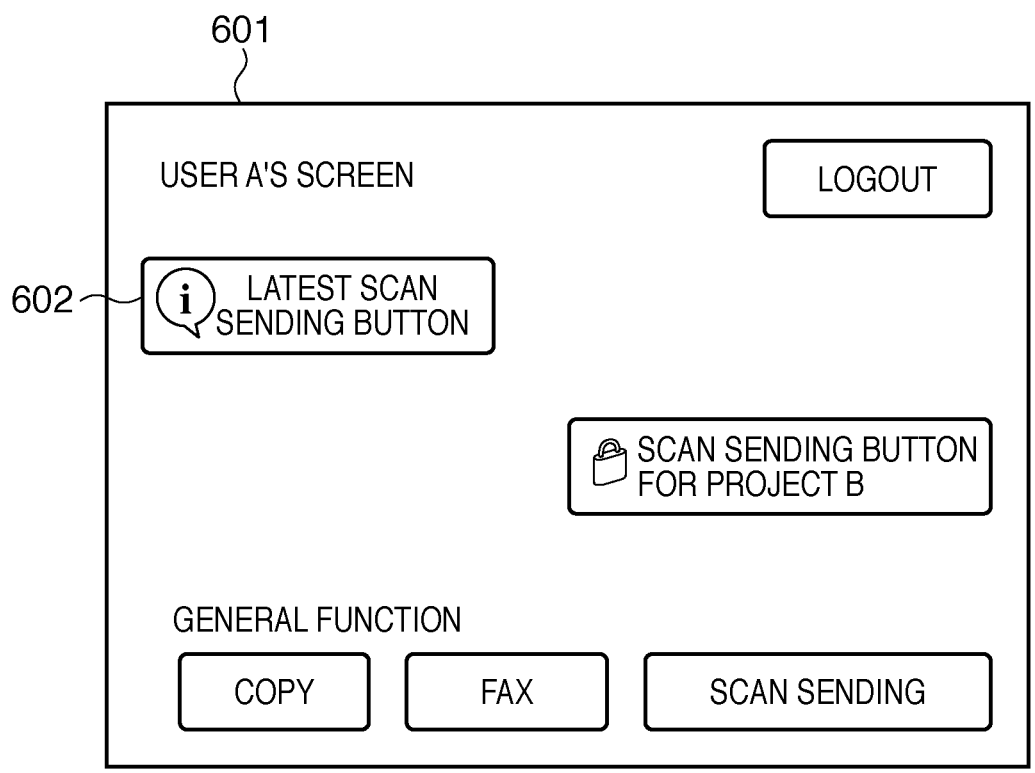
FIG. 17 is a view showing an example of a user interface displayed on an operation unit of the image processing apparatus of the device control system according to the first embodiment of the present invention.

FIG. 5 shows an example of the user interface of the client application 11. The user interface includes an area 501 that displays repository information such as a tree view, a document list area 502 which displays document data 504 in the form of thumbnails or icons, and a peripheral device list area 503 which displays information of peripheral devices such as a digital MFP. For example, the user registers a scan sending button in the digital MFP 20 by operating the user interface of the client application 11. The usable functions of the scan sending button that correspond to the user's authority and settings are displayed on the device application 21. When the scan sending button is not registered, it is not displayed, and the user cannot execute a scan sending function. FIG. 17 (to be described later) shows an example of the scan sending button. Note that the format, area configurations, and controls of the user interface of the client application 11 shown in FIG. 5 are not limited to those shown in FIG. 5, and the user interface may have any other formats as long as they can implement required functions. For example, the document list area 502 and peripheral device list area 503 may display character strings such as file names and device names required to specify documents and peripheral devices in place of thumbnails and icons.

An operation information acquisition unit 302 acquires operation information by the user via the user interface of the client application 11 displayed by the information display unit 301, and notifies the main controller 300 of the acquired information. A scan sending setting unit 303 manages the setting contents of the scan sending button, which is set by the user and is to be registered in the digital MFP 20. A function restriction determination unit 304 determines usable functions and restricted functions of the user based on information acquired from the digital MFP 20. A processing result storage unit 305 saves and stores processing results of the scan sending setting unit 303 and function restriction determination unit 304. A data receiving unit 306 receives document data which is scanned and sent by the digital MFP 20, and notifies the main controller 300 of the received data.

The software configuration in the digital MFP 20 will be described below. A request receiving unit 400 receives a scan sending button registration request from the main controller 300 in the Client PC 10 based on a user instruction, and notifies the main controller 300 of the processing result of the registration request. A function execution unit 401 controls function execution in the digital MFP 20 of the device control system according to the embodiment of the present invention, issues instructions to respective units, and manages the respective units. A user management unit 402 in the login application 22 displays a login screen in response to an instruction from the function execution unit 401, and manages user information or executes authentication processing for a user input in cooperation with a user information storage unit 403.

An authority management unit 404 in the access restriction application 23 generates, stores, and manages access restriction information of the user who has done the login processing to the digital MFP 20 in cooperation with an authority storage unit 405 in response to an instruction from the function execution unit 401. An operation button management unit 406 in the device application 21 registers the scan sending button in an operation button storage unit 407, or extracts and edits information of the scan sending button. Furthermore, the operation button management unit 406 manages restriction release conditions that temporarily release the restricted functions of the digital MFP 20 when an administrator user uses the device application 21. The operation button storage unit 407 stores information of the scan sending button and restriction release conditions. An information display unit 408 displays a user interface on the operation unit of the digital MFP 20 in accordance with an instruction from the function execution unit 401. An operation information acquisition unit 409 acquires operation information by the user via the user interface of the digital MFP 20 displayed by the information display unit 408, and notifies the function execution unit 401 of the acquired information. A data sending unit 410 sends document data, which is scanned by the digital MFP 20 in response to a user instruction, to the data receiving unit 306 of the Client PC 10.

Processes in respective steps of the device control system according to the first embodiment of the present invention will be described in detail below with reference to FIGS. 1 to 18.

[Restriction Release Condition Registration]

Figure 6:
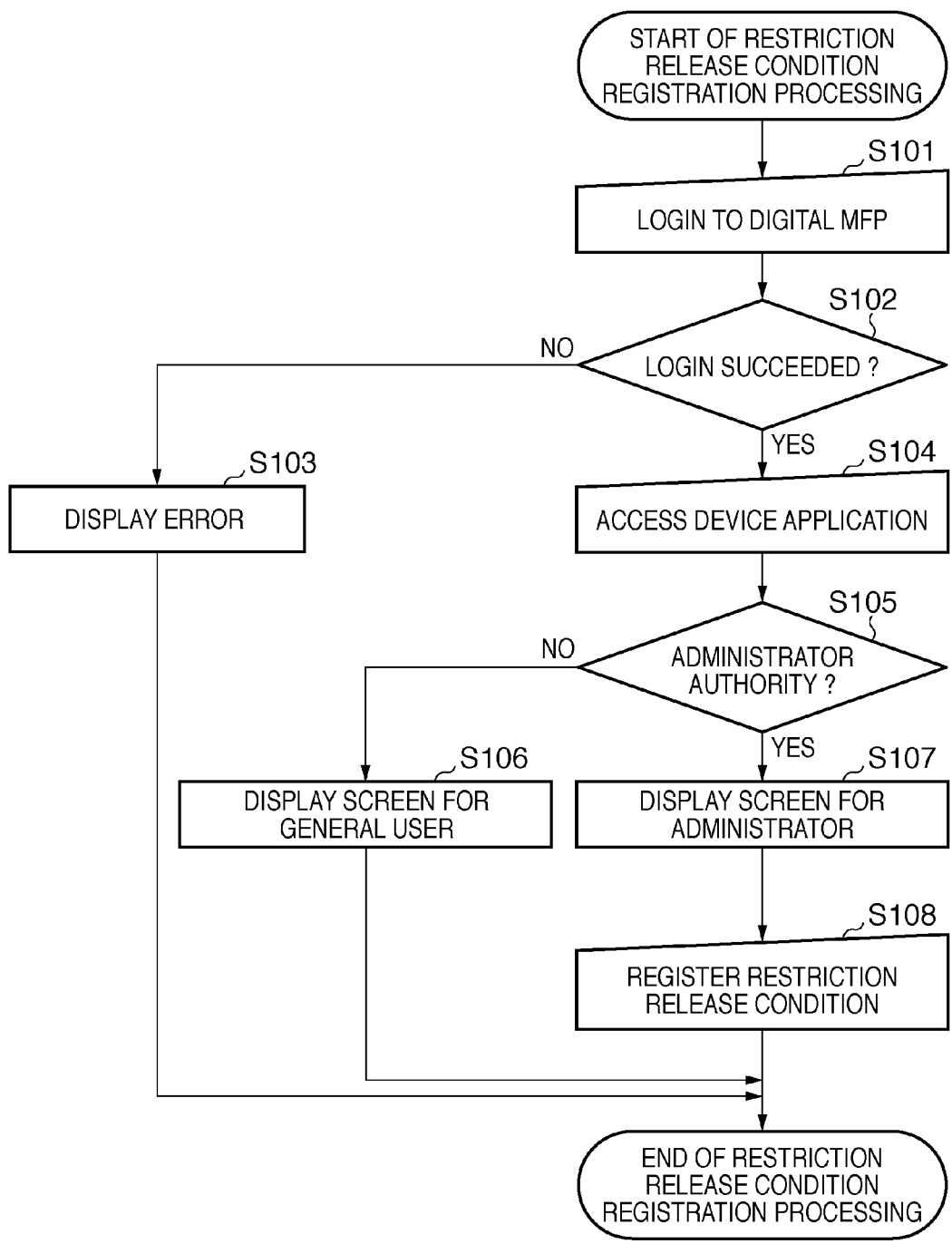
FIG. 6 is a flowchart showing an overview of the sequence of restriction release condition registration processing of the device control system according to the first embodiment of the present invention.

An administrator user registers restriction release conditions in the digital MFP 20 via a browser (not shown) on the Client PC 10. FIG. 6 is a flowchart showing an overview of the sequence of restriction release condition registration processing. Note that this embodiment will explain the processing in which the administrator user accesses the digital MFP 20 using the browser (not shown) on the Client PC 10 and registers the restriction release conditions. Alternatively, the administrator user may register the restriction release conditions via the client application 11. Also, the administrator user may register the restriction release conditions via the user interface displayed on the operation unit of the digital MFP 20. According to registered restriction release information, function restrictions for each user are temporarily released.

This processing will be described below using FIGS. 6 and 7. In step S101, the administrator user accesses the digital MFP 20 according to the embodiment of the present invention via the browser (not shown) on the Client PC 10. The function execution unit 401 receives a notification from the request receiving unit 400, and instructs the user management unit 402 to acquire a login screen. The administrator user inputs self login information in the login screen, which is returned by the function execution unit 401 via the request receiving unit 400 and is displayed on the browser on the Client PC 10, thus executing the login processing.

In step S102, the request receiving unit 400 receives the login information input by the administrator user in step S101, and notifies the function execution unit 401 of the login information. The function execution unit 401 instructs the user management unit 402 to inquire about whether or not information of that user is stored in the user information storage unit 403 and to determine whether or not to accept the login information. Note that role information of the user is also acquired at this time. If it is determined that the login information is not accepted, the process advances to step S103, and the function execution unit 401 returns error information to the Client PC 10 to display a login failure message on the browser, thus ending the processing. If it is determined in step S102 that the administrator user is permitted to login to the digital MFP 20, the function execution unit 401 generates a screen for the administrator user in step S104. The administrator user accesses the device application 21 via the screen for the administrator user, which is returned by the function execution unit 401 via the request receiving unit 400 and is displayed on the browser on the Client PC 10.

If the administrator user accesses the device application 21 in step S104, the function execution unit 401, which received a login success message from the request receiving unit 400, determines in step S105 whether or not the login user has an administrator authority. In this case, the function execution unit 401 may determine the presence/absence of the administrator authority by sending an inquiry to the user management unit 402 or based on the role information acquired in step S102. If the login user does not have any administrator authority, the process advances to step S106, and the function execution unit 401 returns a screen for a general user to the Client PC 10 to display it on the browser, thus ending the registration processing. If it is determined in step S105 that the login user has the administrator authority, the function execution unit 401 generates a screen for an administrator, and returns it via the request receiving unit 400 to display that screen on the browser on the Client PC 10 in step S107. Then, in step S108, the administrator user registers restriction release conditions in the device application 21 via the screen for the administrator displayed in step S107. The function execution unit 401 instructs the operation button management unit 406 to store the restriction release conditions instructed to be registered in the operation button storage unit 407.

An example of the restriction release conditions registered in the device application 21 will be described below with reference to FIG. 7. In the restriction release condition, an identifier used to specify a client application, a role of a user whose restriction is to be released, a restriction release target function, a valid usage count of an ACT issued upon releasing a restriction, a validity period of the issued ACT, and the like can be set. Then, even for a function in the digital MFP 20 which is normally restricted to be used by a general user, when that user satisfies a restriction exception condition, an ACT is issued as restriction release information used to temporarily release the restriction, and the user can use the function using this ACT (to be referred to as a disposable ACT hereinafter). When the usage count of a disposable ACT between the client application 11 and device application 21 in single scan sending button registration processing is obvious like in this embodiment, it is desirable to set that value. Thus, unexpected usage of a disposable ACT can be avoided. The condition for restricting the disposable ACT usage condition is not limited to this, but it may be set by pairing the disposable ACT usage count and the contents of a request from the client application at that time. The restriction release conditions are not limited to those described above. For example, a certificate (public key) corresponding to a client application may be registered, or complicated conditional formulas may be registered.

[Scan Sending Button Registration Processing]

Figure 8:
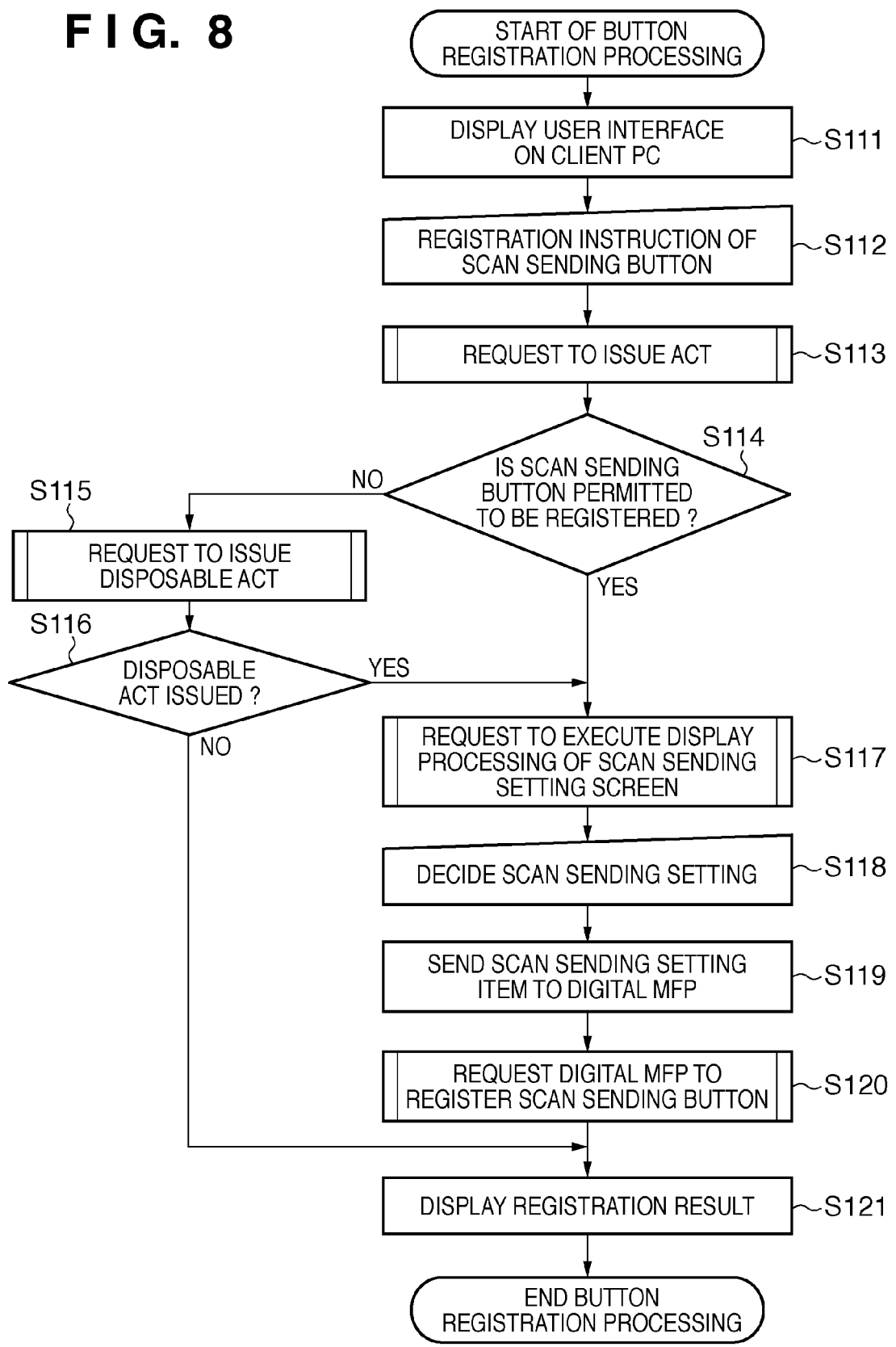
FIG. 8 is a flowchart showing an overview of the sequence of scan sending button registration processing of the device control system according to the first embodiment of the present invention.

User A registers a scan sending button in the digital MFP 20 via the client application 11 installed in the Client PC 10. FIG. 8 is a flowchart showing an overview of the sequence of scan sending button registration processing. This processing will be described below using FIGS. 8 and 9.

In step S111, the client application 11 is launched in response to an instruction from user A. The main controller 300 instructs the information display unit 301 to display the user interface of the client application 11 on the display 108 of the Client PC 10. In this case, the main controller 300 displays document data included in a folder selected by user A on the area 501, which displays repository information such as a tree view, on the document list area 502. Also, the main controller 300 acquires information of peripheral devices such as the digital MFP 20 accessible from the client application 11, and displays them on the peripheral device list area 503.

In step S112, user A instructs the digital MFP 20 to register a scan sending button via the user interface displayed on the display 108 in step S111. The operation information acquisition unit 302, which accepted the scan sending button registration instruction from user A, sends that instruction to the main controller 300. The main controller 300, which accepted the scan sending button registration instruction from user A in step S112, requests the request receiving unit 400 of the digital MFP 20 to acquire an ACT of user A in step S113. ACT issuance processing required to acquire an ACT from the digital MFP 20 will be described later with reference to FIG. 10.

An example of an ACT issued by the digital MFP 20 of this embodiment will be described below with reference to FIG. 9. The ACT of this embodiment is described in XML, but other description methods may be used. Also, contents to be described may be other than those shown in FIG. 9. Reference numeral 701 denotes a description of user information who acquires an ACT. Reference numeral 702 denotes a description of applications and functions of the digital MFP 20, which can be used by user A who acquires the ACT. Reference numeral 703 denotes a description of detailed access restrictions associated with the scan sending function of the digital MFP 20 for user A who acquires the ACT. In step S114, the function restriction determination unit 304 analyzes the ACT acquired in step S113, and inquires about whether or not to register a scan sending button as a processing request from user A to the digital MFP 20. If it is determined that a scan sending button cannot be registered, the process advances to step S115; otherwise, the process advances to step S117.

In step S115, the main controller 300 requests the digital MFP 20 to issue a disposable ACT. The disposable ACT issuance processing in the digital MFP 20 in this step will be described later with reference to FIG. 11. After that, the process advances to step S116. The main controller 300 instructs the function restriction determination unit 304 to determine in step S116 whether or not a disposable ACT is normally issued in step S115. If it is determined that a disposable ACT is issued, the process advances to step S117; otherwise, the process jumps to step S121. If it is determined in step S116 that a disposable ACT required to register a scan sending button in the digital MFP 20 is issued, the client application 11 displays a scan sending setting screen on the display 108 in step S117. Note that the scan sending setting screen display processing in the digital MFP 20 will be described later with reference to FIG. 15.

In step S118, user A inputs and decides a scan sending button setting via the scan sending setting screen displayed in step S117. After user A decides the scan sending button setting in step S118, the main controller 300 sends the setting items of the scan sending button to the request receiving unit 400 of the digital MFP 20 in step S119. Upon reception of the scan sending button registration request in step S119, the function execution unit 401 instructs the operation button management unit 406 to store the scan sending button in the operation button storage unit 407 in step S120. The scan sending button registration processing in the digital MFP 20 will be described later with reference to FIG. 16.

In step S121, the function execution unit 401 notifies the main controller 300 in the Client PC 10 of the storage result in the operation button storage unit 407 in step S120 via the request receiving unit 400. The main controller 300 instructs the information display unit 301 to display the scan sending button registration result received from the request receiving unit 400 on the display 108, thus notifying user A of it. If it is determined in step S116 that no disposable ACT is issued, a message that advises accordingly is displayed.

[ACT Issuance]

Figure 10:
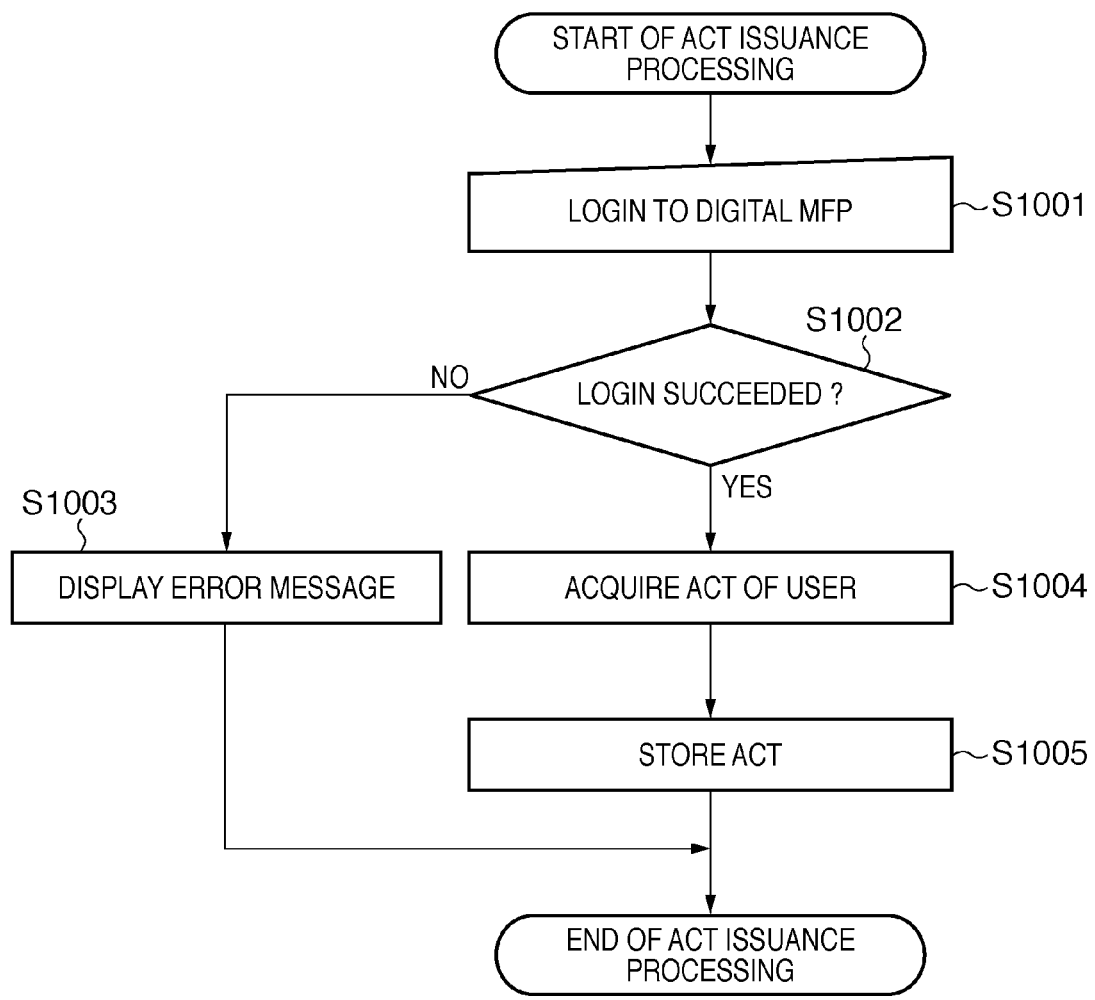
FIG. 10 is a flowchart showing the sequence of ACT issuance processing of the device control system according to the first embodiment of the present invention.

If user A sends the scan sending button registration instruction via the client application 11 of the Client PC 10 of the device control system according to the embodiment of the present invention in step S112, an ACT of user A is acquired. FIG. 10 is a flowchart showing the sequence of the ACT issuance processing. The processing associated with ACT issuance will be described in detail below with reference to FIG. 10.

In step S1001, the main controller 300, which received the scan sending button registration instruction from user A in step S112, displays a login input screen (not shown) on the display 108. The main controller 300 instructs the operation information acquisition unit 302 to send information input by user A as login information to the digital MFP 20. The function execution unit 401, which received a notification from the request receiving unit 400, instructs the user management unit 402 to inquire about whether or not information of the login user is stored in the user information storage unit 403, and to determine whether or not to accept the login information. In this case, the role information of the user is also acquired. If it is determined in step S1002 that user A has failed to login to the digital MFP 20 in step S1001, the process advances to step S1003, and the function execution unit 401 returns error information to the Client PC 10 to display an error on the display 108, thus ending the processing.

If user A has succeeded to login to the digital MFP 20 in step S1001, the function execution unit 401 instructs the authority management unit 404 to generate an ACT corresponding to the role (group) to which user A belongs in step S1004. The generated ACT is returned to the main controller 300 via the request receiving unit 400. As described above, FIG. 9 shows an example of an ACT generated by the digital MFP 20 of this embodiment. In this embodiment, the ACT shown in FIG. 9 indicates that user A has a general user authority ("GeneralUser" in the description 701) and is allowed to execute a scan sending function ("SendFlag" in the description 703). On the other hand, this ACT indicates that user A is not allowed to execute management ("AddressManagement" in the description 703) such as registration and deletion of the scan sending button. In step S1005, the main controller 300 stores the ACT which is acquired in step S1004 and corresponds to user A in the processing result storage unit 305.

[Disposable ACT Issuance]

Figure 11:
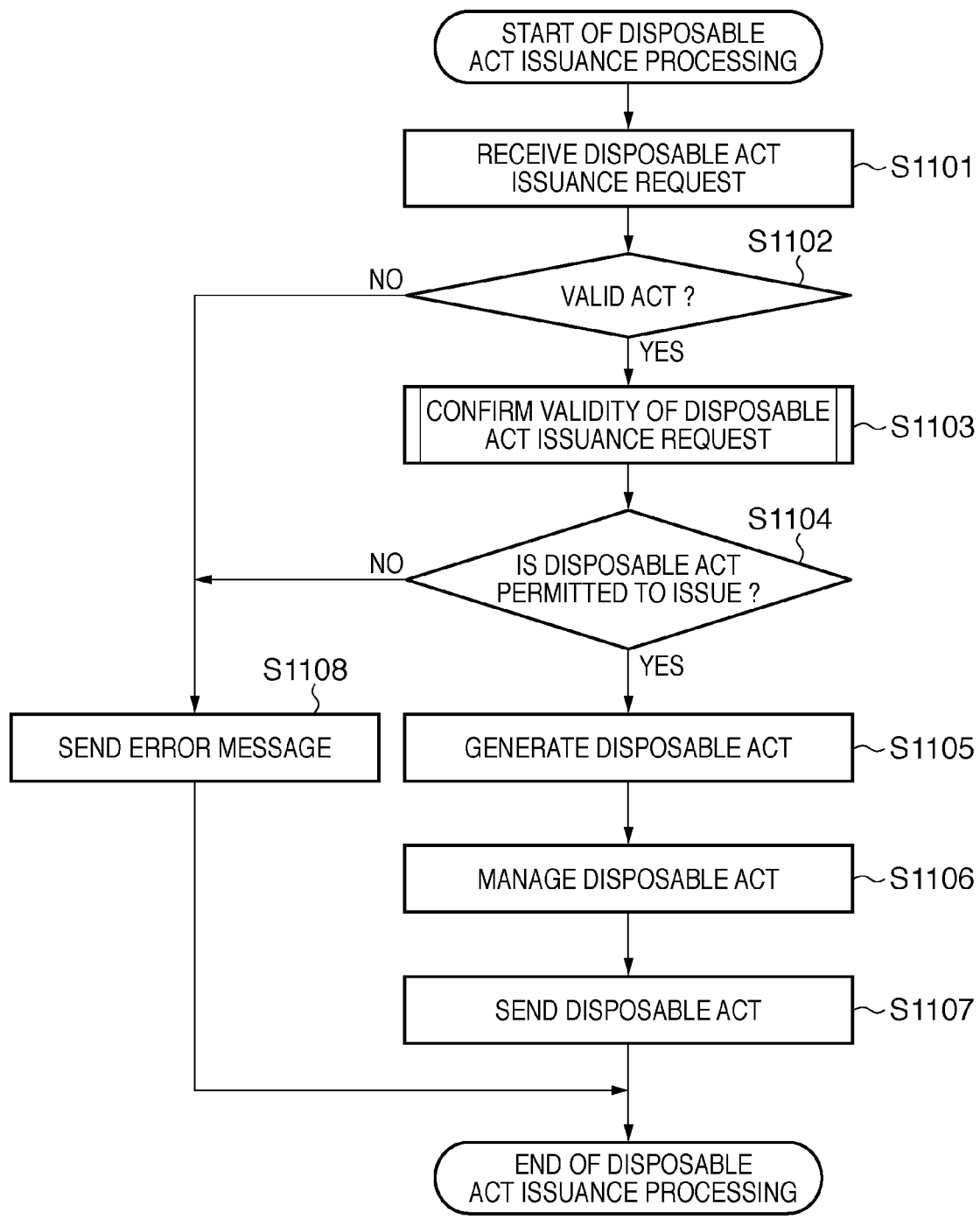
FIG. 11 is a flowchart showing the sequence of disposable ACT issuance processing of the device control system according to the first embodiment of the present invention.

If it is determined in step S114 that user A cannot register any scan sending button in the digital MFP 20, a disposable ACT of user A is acquired. FIG. 11 is a flowchart showing the sequence of disposable ACT issuance processing. This processing will be described in detail below with reference to FIGS. 11 to 14. If it is determined in step S114 that user A cannot register any scan sending button in the digital MFP 20, the main controller 300 requests the digital MFP 20 to issue a disposable ACT in step S1101. In this case, the main controller 300 sends information required to determine whether or not to satisfy the restriction release condition registered in step S108 to the request receiving unit 400. More specifically, the main controller 300 sends the ACT of user A stored in the processing result storage unit 305 in step S1005, an identifier used to specify the client application 11, a restriction release target function (a scan sending button registration function in this embodiment), and the like. Note that the main controller 300 may send other kinds of information.

In step S1102, the function execution unit 401 passes the ACT of the disposable ACT issuance request information received by the request receiving unit 400 in step S1101 to the authority management unit 404 to determine its validity. Note that ACT validity determination items include an item as to whether or not the ACT was generated and issued by the authority management unit 404 in step S1004, and an item as to whether or not the validity period since issuance has expired. The ACT validity may be determined based on information other than those described above. If it is determined in step S1102 that the ACT is valid, the function execution unit 401 instructs the operation button management unit 406 to determine the validity of the disposable ACT issuance request information in step S1103.

The flowchart showing the sequence of the disposable ACT issuance request validity confirmation processing in the operation button management unit 406 will be described below with reference to FIG. 12. The operation button management unit 406 determines in step S1111 whether or not the operation button storage unit 407 stores the restriction release conditions registered in step S108. If the operation button storage unit 407 stores the restriction condition release conditions, the process advances to step S1112; otherwise, the process jumps to step S1117. If it is determined in step S1111 that the operation button storage unit 407 stores the restriction release conditions, the operation button management unit 406 reads out the restriction release conditions from the operation button storage unit 407 in step S1112. The operation button management unit 406 determines in step S1113 whether or not the restriction release conditions read out in step S1112 include the identifier of the client application 11 included in the disposable ACT issuance request. If the restriction release conditions include that identifier, the process advances to step S1114; otherwise, the process jumps to step S1117. In this embodiment, the client application 11 is determined using the identifier assigned to a client application. However, other method may be used, and the identification method is not particularly limited.

If it is determined in step S1113 that the restriction release conditions include the identifier of the client application 11, the operation button management unit 406 further determines in step S1114 whether or not the role of user A included in the disposable ACT issuance request matches a restriction release target role in the narrowed-down restriction release condition. If the two roles match, the process advances to step S1115; otherwise, the process advances to step S1117. If the narrowed-down restriction release condition is satisfied in step S1114, the operation button management unit 406 further determines in step S1115 whether or not the release target function included in the disposable ACT issuance request matches that in the narrowed-down restriction release condition. If the two functions match, the process advances to step S1116; otherwise, the process advances to step S1117. If it is determined in step S1115 that the restriction release condition which can be satisfied by the contents of the disposable ACT issuance request is stored, the operation button management unit 406 returns a value indicating that the contents of the disposable ACT issuance request are valid to the function execution unit 401 in step S1116. By contrast, if the condition in any of steps S1111, S1113, S1114, and S1115 is not met, the operation button management unit 406 generates a return value that advises accordingly in step S1117. The process then advances to step S1116, and the operation button management unit 406 returns a value indicating that the contents of the disposable ACT issuance request are invalid to the function execution unit 401.

With the aforementioned sequence, the disposable ACT issuance request validity confirmation processing is performed. After the control returns to the sequence of the disposable ACT issuance processing, the function execution unit 401 determines in step S1104 whether or not the validity of the disposable ACT issuance request can be determined in step S1103. If it is determined that the disposable ACT issuance request is valid, the process advances to step S1105; otherwise, the process advances to step S1108. If it is determined that the disposable ACT issuance request is invalid, the process advances to step S1108, and the function execution unit 401 sends an error message to the Client PC 10. The Client PC 10 displays the received error message on the display 108. Subsequently, if it is determined in step S1104 that the disposable ACT issuance request is valid, the function execution unit 401 requests the authority management unit 404 to generate a disposable ACT in step S1105.

An example of a disposable ACT will be described below using FIG. 13. FIG. 13 shows an example of a disposable ACT issued by the digital MFP 20 of this embodiment. As a difference from the ACT shown in FIG. 9 that user A can normally acquire, the disposable ACT includes a description which permits a function that cannot be originally used by user A and that which allows usage in only a specific purpose. More specifically, a description 712 restricts applications and functions of the digital MFP 20 that can be used by the disposable ACT. Furthermore, a description 713 permits user A to use management such as registration and deletion of a scan sending button that cannot be originally used by user A (more specifically, "Permit" "AddressManagement"). After the control returns to the disposable ACT issuance processing, the function execution unit 401 instructs the authority management unit 404 to manage the disposable ACT generated in step S1105 in the authority storage unit 405 in step S1106.

FIG. 14 shows an example of management information for the disposable ACT of this embodiment. The management information includes an identifier required to specify a client application, identification information of a disposable ACT, a valid usage count and current usage count of the disposable ACT, an issuance time of the disposable ACT, a validity period of the disposable ACT, and the like. Note that the management information is not limited to such specific kinds of information. For example, information required to specify the Client PC 10 may be included, and hash information of the disposable ACT may also be included. In step S1107, the function execution unit 401 sends the disposable ACT generated in step S1105 to the main controller 300 via the request receiving unit 400. The main controller 300 stores the received disposable ACT in the processing result storage unit 305. With the aforementioned sequence, the disposable ACT issuance processing is executed.

[Scan Sending Setting Screen Display]

Figure 15:
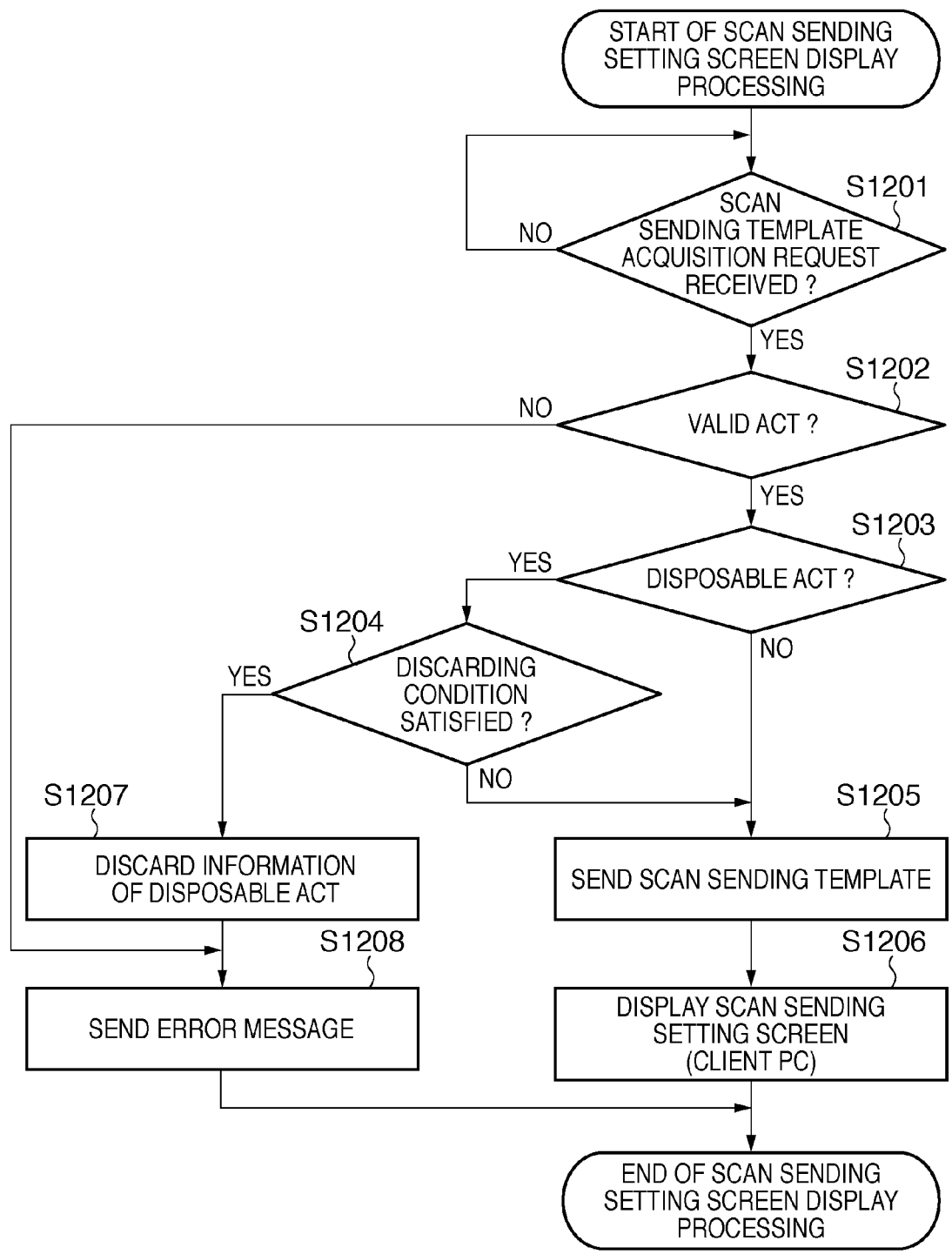
FIG. 15 is a flowchart showing the sequence of processing for displaying a scan sending setting screen of the device control system according to the first embodiment of the present invention.

After the ACT required to register a scan sending button in the digital MFP 20 is acquired in steps S113 and S115, the scan sending setting screen is displayed on the client application 11 as the processing requested by user A. FIG. 15 is a flowchart showing the sequence of the processing for displaying the scan sending setting screen. This processing will be described in detail below with reference to FIG. 15.

In step S1201, the request receiving unit 400 receives a scan sending button registration template acquisition request of the digital MFP 20 from the main controller 300. In this case, the main controller 300 sends the ACT or disposable ACT stored in the processing result storage unit 305 to the request receiving unit 400 depending on the situation. Upon reception of the scan sending template acquisition request, the request receiving unit 400 notifies the function execution unit 401 of the request. In step S1202, the function execution unit 401 passes the ACT received by the request receiving unit 400 in step S1201 to the authority management unit 404 to determine its validity. Note that the validity of the ACT is determined by checking whether or not the ACT was generated and issued by the authority management unit 404 in step S1004, whether or not the validity period since issuance has expired, and so forth. Note that the present invention is not limited to the determination items described here, and the validity of the ACT may be determined based on other kinds of information. If it is determined that the ACT is valid, the process advances to step S1202; otherwise, the process jumps to step S1208.

If it is determined in step S1202 that the validity of the ACT is confirmed, the function execution unit 401 sends, to the authority management unit 404, an inquiry about whether or not the ACT is a disposable ACT in step S1203. More specifically, the authority management unit 404 determines whether or not the disposable ACT management information stored in the authority storage unit 405 includes the contents of the ACT. For example, when the ACT describes information indicating whether or not it is disposable, whether or not the ACT is disposable may be determined based on that information. If the ACT is disposable, the process advances to step S1204; otherwise, the process advances to step S1205. If it is determined in step S1203 that the ACT is a disposable ACT, the authority management unit 404 determines in step S1204 based on the valid usage count and validity period included in the disposable ACT management information whether or not a discarding condition is satisfied.

The discarding condition is satisfied when the usage count has reached the valid usage count set in the disposable ACT management information or when the validity period since the disposable ACT issuance time has expired. The discarding condition is not limited to those described here, and other criteria may be set to determine whether or not the discarding condition is satisfied. For example, when the usage purpose of the disposable ACT is obvious, whether or not the discarding condition is satisfied may be determined based on the usage count of the disposable ACT and the contents of a request from the client application at that time. In this embodiment, whether or not the discarding condition is satisfied may be determined by seeing whether or not the first usage of the disposable ACT is a scan sending template acquisition request. If the defined discarding condition is satisfied, the process advances to step S1207; otherwise, the process advances to step S1205.

If it is determined in step S1204 that the discarding condition is satisfied, the process advances to step S1207. In step S1207, the authority management unit 404 deletes the information of the disposable ACT from the disposable ACT management information, and stores the updated disposable ACT management information in the authority storage unit 405. The process then advances to step S1208, and the function execution unit 401 sends an error message to the Client PC 10. The Client PC 10 displays the received error message on the display 108. If it is determined in step S1204 that the discarding condition is not satisfied, the authority management unit 404 counts up the usage count of the disposable ACT management information to update the management information, and the process then advances to step S1205.

In step S1205, the function execution unit 401 acquires a scan sending template stored in the operation button storage unit 407 via the operation button management unit 406, and sends that template to the main controller 300 via the request receiving unit 400. Note that the scan sending template includes information such as a scan resolution, color mode, file format at the time of storage, and transmission protocol. However, the present invention is not limited to such specific information, and the template may hold other kinds of information.

This embodiment adopts the arrangement in which the scan sending template is acquired from the digital MFP 20 in consideration that the scan sending template includes information depending on the digital MFP 20. Alternatively, the scan sending template may be held by the client application 11 as fixed information.

Furthermore, the function execution unit 401 may change the contents of the scan sending template in consideration of the function restrictions in the ACT received in step S1201, and may return the changed scan sending template to the main controller 300. More specifically, the contents of the scan sending template may be changed to include only a protocol available for user A as options of the transmission protocols. In step S1206, the scan sending setting unit 303 generates a scan sending setting screen using the scan sending template acquired in step S1205, and displays that screen on the display 108 via the information display unit 301. Note that the main controller 300 may change the contents of the acquired scan sending template, for example, items to be displayed on the scan sending setting screen in consideration of the function restrictions in the ACT stored in the processing result storage unit 305.

[Scan Sending Button Registration]

Figure 16:
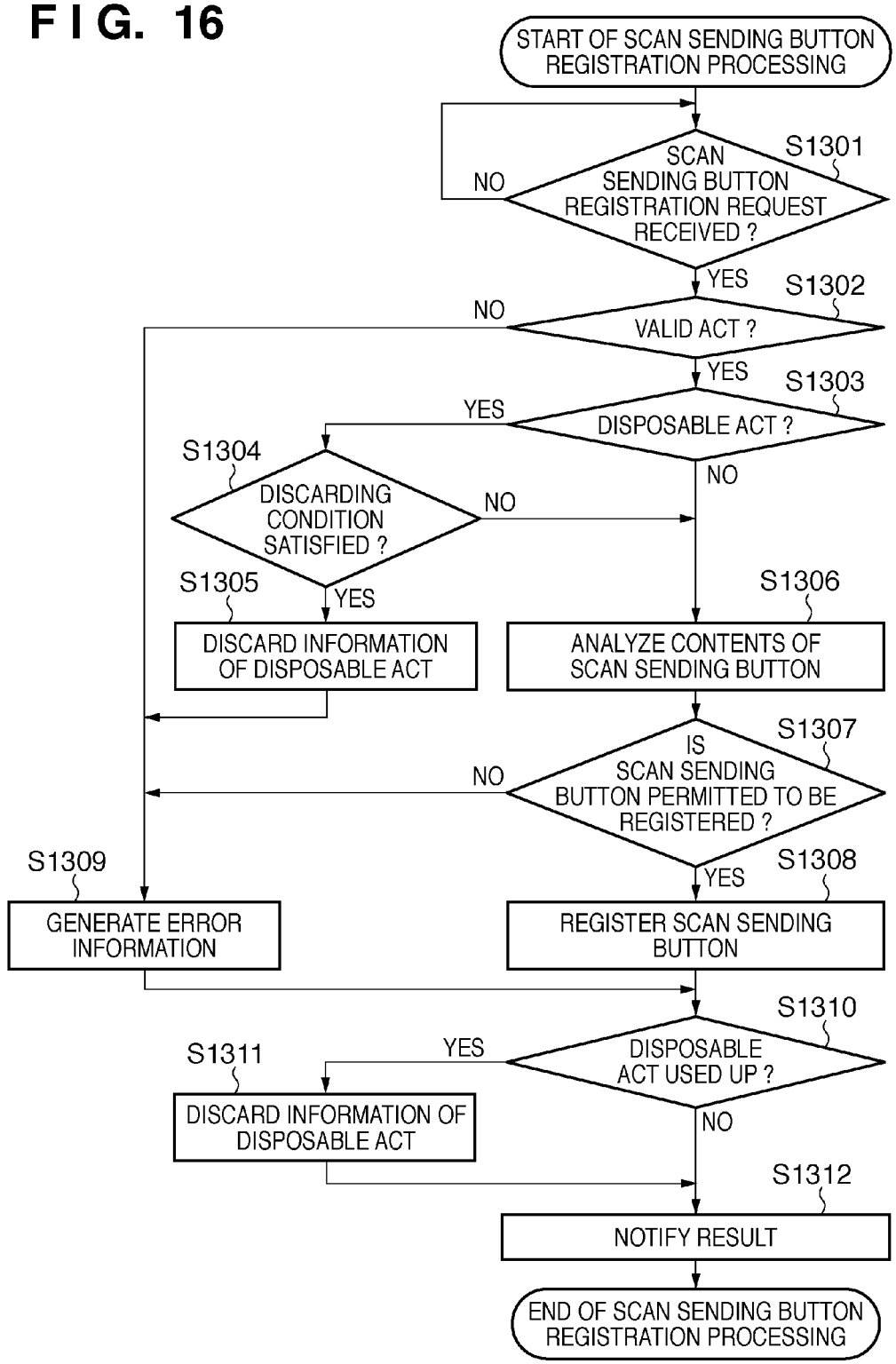
FIG. 16 is a flowchart showing the sequence of scan sending button registration processing to the image processing apparatus of the device control system according to the first embodiment of the present invention.

Upon reception of a scan sending button registration request from the client application 11 in the Client PC 10 of the device control system according to the embodiment of the present invention in step S119, the scan registration button is registered in the digital MFP 20. FIG. 16 is a flowchart showing the sequence of the scan sending button registration processing in the digital MFP 20. This processing will be described in detail below with reference to FIGS. 16 and 17.

The request receiving unit 400 determines in step S1301 whether or not a request received from the client application 11 in the Client PC 10 in step S119 is a scan sending button registration request. If that request is a registration request, the process advances to step S1302. In step S1302, the function execution unit 401 passes the ACT received by the request receiving unit 400 in step S1301 to the authority management unit 404 to determine its validity. Note that determination items of the validity of the ACT include an item as to whether or not the ACT was generated and issued by the authority management unit 404 in step S1004, and that as to whether or not the validity period since issuance has expired. The present invention is not limited to these items described here, and the validity of the ACT may be determined based on other kinds of information. If it is determined that the ACT is valid, the process advances to step S1303; otherwise, the process jumps to step S1309.

If it is determined in step S1302 that the validity of the ACT is confirmed, the function execution unit 401 instructs the authority management unit 404 to determine in step S1303 whether or not the ACT is a disposable ACT. More specifically, the authority management unit 404 determines whether or not the disposable ACT management information stored in the authority storage unit 405 includes the contents of the ACT. Note that the present invention is not limited to this determination method. For example, when the ACT describes information indicating as to whether or not it is a disposable ACT, this determination process may be implemented based on that information. If it is determined that the ACT is a disposable ACT, the process advances to step S1304; otherwise, the process advances to step S1306. If it is determined in step S1303 that the ACT is a disposable ACT, the authority management unit 404 determines in step S1304 based on the valid usage count and validity period included in the disposable ACT management information whether or not a discarding condition is satisfied.

The discarding condition is satisfied when the usage count has reached the valid usage count defined in the disposable ACT management information or when the validity period since the disposable ACT issuance time has expired. The present invention is not limited to these items, and other criteria may be set to determine whether or not the discarding condition is satisfied. For example, when the usage purpose of the disposable ACT is obvious, whether or not the discarding condition is satisfied may be determined based on the usage count of the disposable ACT and the contents of a request from the client application at that time. In this embodiment, whether or not the discarding condition is satisfied may be determined by seeing whether or not the second usage of the disposable ACT is a scan sending button registration request. If the discarding condition is satisfied, the process advances to step S1305; otherwise, the process advances to step S1306.

If the discarding condition is satisfied, the process advances to step S1305. In step S1305, the authority management unit 404 deletes the information of the disposable ACT from the disposable ACT management information, and stores the updated disposable ACT management information in the authority storage unit 405. Furthermore, the process advances to step S1309 to generate error information. In step S1306, the operation button management unit 406 analyzes the scan sending button registration request received by the request receiving unit 400 in step S1301 in response to an instruction from the function execution unit 401. More specifically, the operation button management unit 406 determines whether or not all settings in the contents of the scan sending button registration request are allowed to register a scan sending button in the digital MFP 20 without changing them. For example, the operation button management unit 406 determines whether or not the scan sending button registration request includes a color setting although the digital MFP 20 includes a monochrome scanner and whether or not the functions restricted by the received ACT are set in the scan sending button registration request.

Then, in step S1307, the function execution unit 401 determines based on the analysis result in step S1306 whether or not the scan sending button can be registered according to the registration request. If it is determined that the scan sending button cannot be registered, the process advances to step S1309 to generate error information. If it is determined that the scan sending button can be registered, the process advances to step S1308. If it is determined in step S1307 that the scan sending button can be registered without changing the contents of the registration request, the operation button management unit 406 stores the scan sending button in the operation button storage unit 407 in step S1308. Then, the user can register the scan sending button in the digital MFP 20. Note that the scan sending button may be registered for each user or to be shared by each group or everyone.

In step S1309, an error screen is generated in accordance with the determination result in each of steps S1302, S1304, and S1307. After that, the process advances to step S1310. The function execution unit 401 determines in step S1310 whether or not the ACT is the disposable ACT and is normally used up for registration of the scan sending button. More specifically, the function execution unit 401 instructs the authority management unit 404 to determine whether or not the usage count of the disposable ACT management information after it is counted up has reached the upper limit of the valid usage count. If it is determined that the disposable ACT is used up, the process advances to step S1311; otherwise, the process advances to step S1312. If it is determined in step S1310 that the disposable ACT is used up, the authority management unit 404 stores the disposable ACT from the management information, and stores the updated disposable ACT management information in the authority storage unit 405 in step S1311. In step S1312, the function execution unit 401 notifies the main controller 300 of the scan sending button registration processing result in step S1308 via the request receiving unit 400. With the aforementioned processes, the scan sending button registration processing is complete.

FIG. 17 shows an example of a user interface displayed on the operation unit of the digital MFP 20 of the device control system according to the embodiment of the present invention. When the user logins to the digital MFP 20, a local UI 601 and a registered scan sending button 602 are displayed on the operation unit of the digital MFP 20. Note that the format, configuration, and controls of the example of the user interface shown in FIG. 17 are not limited to those shown in FIG. 17. For example, a browser (not shown) may run on the operation unit of the digital MFP 20, and the contents to be displayed may be generated based on HTML data.

[Scan Sending Processing]

User A executes scan sending processing via the digital MFP 20, and the client application 11 in the Client PC 10 of the device control system according to the embodiment of the present invention acquires a document. FIG. 18 is a flowchart showing the sequence of the scan sending processing. This processing will be described below with reference to FIG. 18.

In step S131, the user logins to the digital MFP 20 of the device control system according to the embodiment of the present invention. The function execution unit 401 acquires the scan sending button stored in the operation button storage unit 407 via the operation button management unit 406. The function execution unit 401 instructs the information display unit 408 to display a user interface on which information of the scan sending button is laid out on the operation unit of the digital MFP 20. In step S132, the operation information acquisition unit 409, which accepted pressing of the scan sending button by the user via the user interface displayed on the digital MFP 20 in step S131, sends information indicating that operation to the function execution unit 401. In step S133, the function execution unit 401 instructs the authority management unit 404 to acquire an ACT corresponding to a role (group) to which user A belongs using the login information of user A input in step S131.

In step S134, the function execution unit 401, which accepted pressing of the scan sending button by the user in step S132, acquires detailed information of the scan sending button stored in the operation button storage unit 407 via the operation button management unit 406. Furthermore, the function execution unit 401 compares the ACT of user A acquired in step S133 and the contents of the scan sending button to be executed to determine whether or not user A is permitted to execute scan sending processing.

If it is determined that user A is not permitted to execute scan sending processing, the process advances to step S138, and the function execution unit 401 displays an error message on the operation unit of the digital MFP 20, thus ending the processing. If it is determined in step S134 that user A is permitted to execute scan sending processing, the function execution unit 401 reads a paper document via the image reading unit 201 of the digital MFP 20 and acquires a scan document in accordance with the detailed information of the scan sending button in step S135. Then, the function execution unit 401 instructs the data sending unit 410 to send the scan document acquired in step S135 to a storage path designated in the scan sending button in step S136. In step S137, the data receiving unit 306 of the Client PC 10 receives the scan document sent by the digital MFP 20 in step S136, and stores the received scan document in the designated storage path. As described above, when the digital MFP 20 cannot directly refer to or make read and write accesses to the path where document data are stored, the digital MFP 20 may send the scan document via a protocol such as FTP (not shown). In this case, a monitor program (not shown) may be launched to automatically move the scan document to the designated storage path.

According to the first embodiment of the present invention, the user is allowed to use the management function such as the scan sending function, which is normally restricted, by releasing the restriction within the setting condition range of the administrator user when the user uses a specific application. Then, the user can use the functions represented by the scan sending function using the digital MFP without bothering the administrator user.

Second Embodiment

The second embodiment of the present invention will be described below with reference to FIGS. 19 to 23. Unlike the device control system according to the first embodiment, the second embodiment adopts an arrangement in which the user operates a client application 11 of this device control system installed in a Client PC 10 to control a digital MFP 20 to execute print processing via a printer driver 12. In this case, the client application 11 acquires a disposable ACT used to temporarily release restricted functions of user A, and controls a print unit (not shown) of the digital MFP 20 to execute print processing. Then, user A can use print settings, which are normally restricted, by operating the client application 11. In this embodiment, the client application 11 is used as a display unit of the print settings. However, the present invention is not limited to this. Note that this embodiment will explain a case in which a device application 21 is an application required to control the print function of the digital MFP 20.

[System Arrangement]

Figure 19:
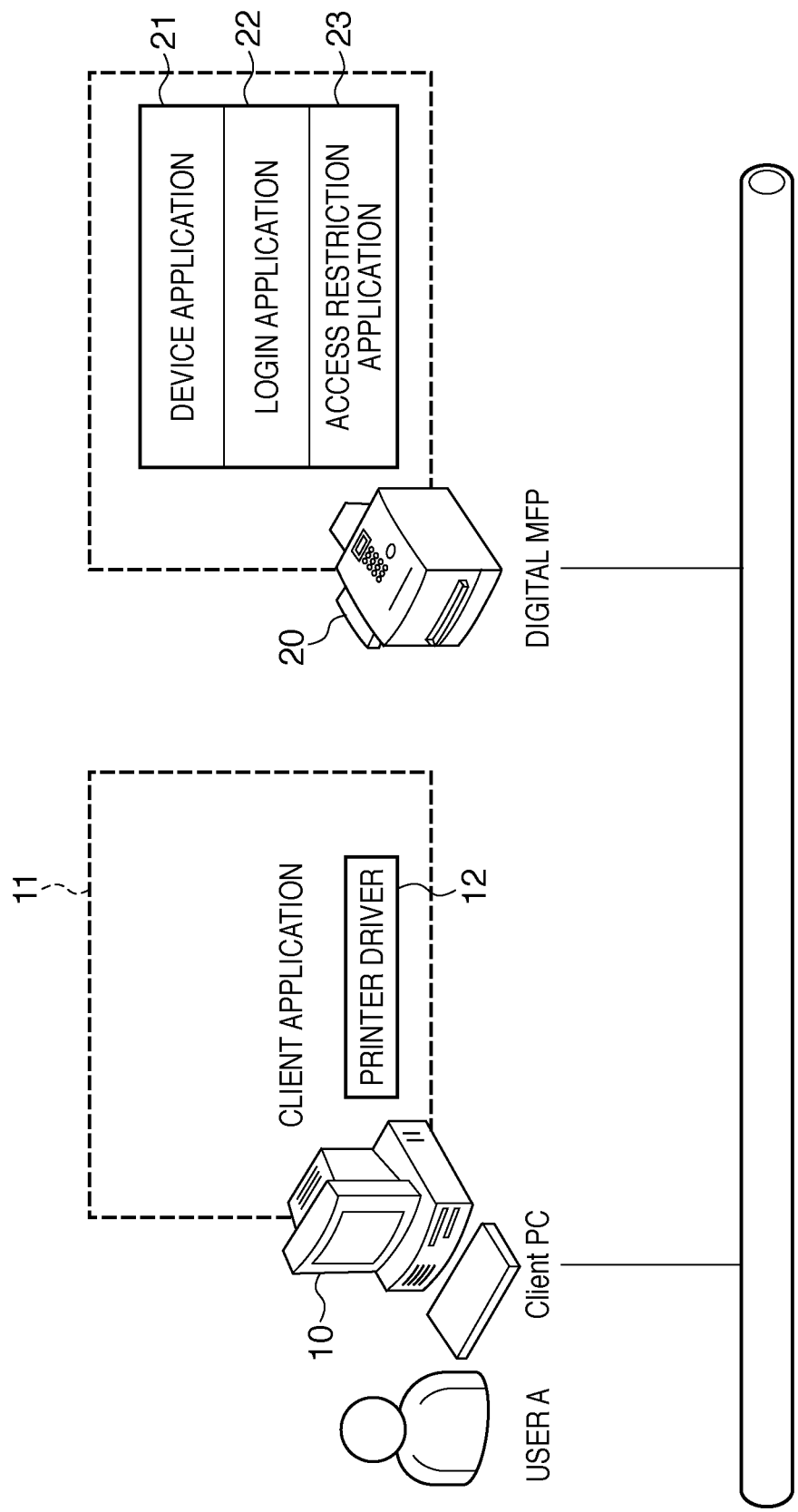
FIG. 19 is a system conceptual diagram of a device control system according to the second embodiment of the present invention.

FIG. 19 is a system conceptual diagram of a device control system according to the second embodiment of the present invention. In the device control system according to this embodiment, a Client PC 10 accessed by user A via a dedicated client application 11 and printer driver 12, and a digital MFP 20 having copy, print, scanner, and FAX functions are connected via a network. The device control system according to this embodiment adopts the arrangement in which user A accesses via the dedicated client application. Alternatively, a browser (not shown) may be installed in the Client PC 10, and the user may operate that browser. In this case, the device control system according to this embodiment may be built on a WEB application server (not shown) to communicate with the browser. In the following description, the device control system according to this embodiment uses the digital MFP 20 as an image processing apparatus. However, any other image processing apparatuses may be used as long as they have a printer function.

[Software Configuration]

Figure 20:
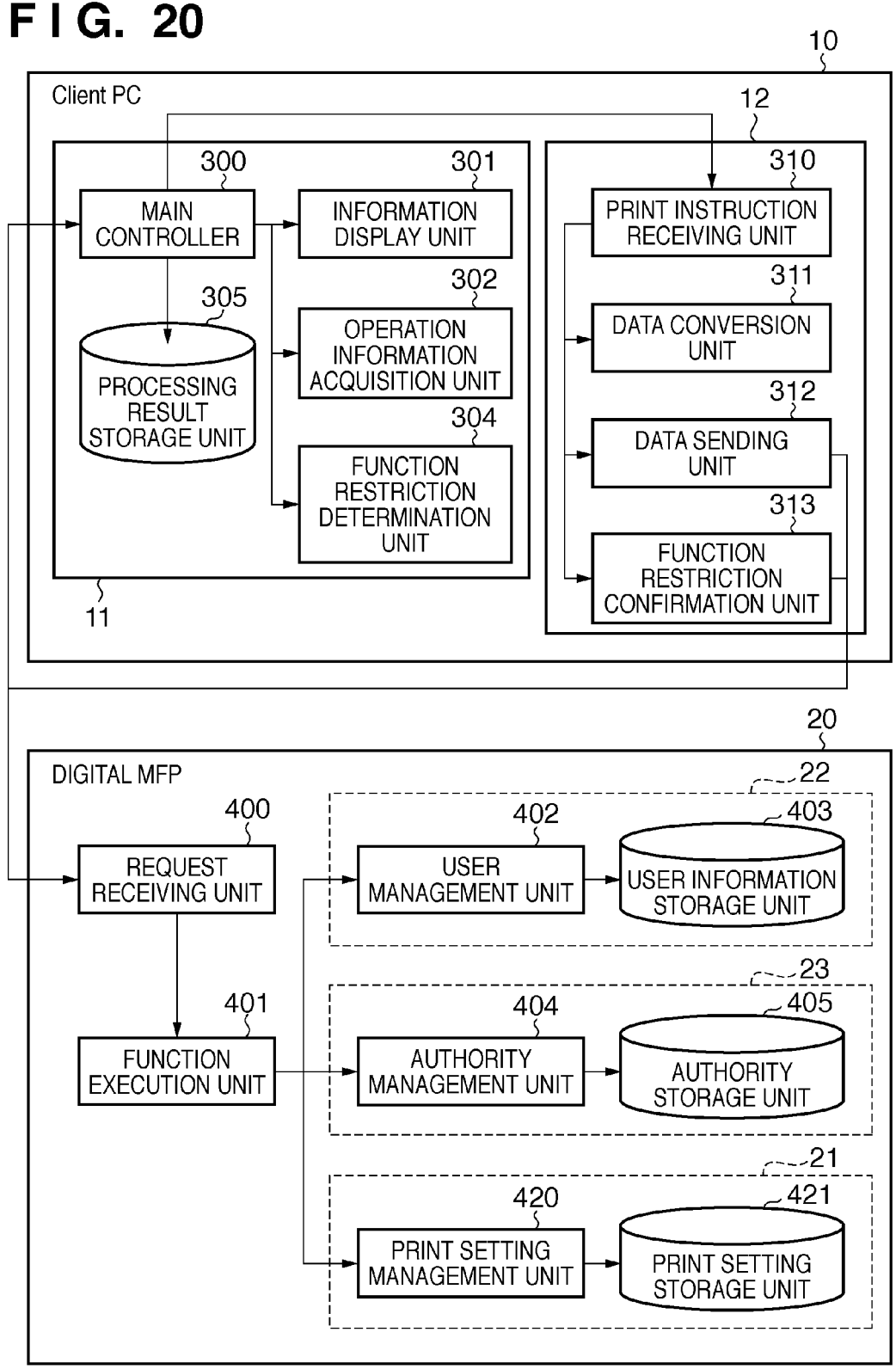
FIG. 20 is a block diagram showing the software arrangement as an example of the device control system according to the second embodiment of the present invention.

FIG. 20 is a block diagram showing the software configuration as an example of the device control system according to the embodiment of the present invention, for example, FIG. 20 shows the software configurations in the Client PC 10 and digital MFP 20. Unlike in the device control system according to the first embodiment, the software configuration of the printer driver 12 is added to the Client PC 10. Furthermore, a device application 21 in the digital MFP 20 includes a configuration required to control a print function. Only the software configuration different from the device control system according to the first embodiment will be described below. Common portions are as described above. The software configuration of the printer driver 12 in the Client PC 10 will be described first.

The printer driver 12 includes a print instruction receiving unit 310, data conversion unit 311, data sending unit 312, and function restriction confirmation unit 313. Note that this proposal will not describe any general technique/arrangement such as rasterize processing required to implement the print function. The print instruction receiving unit 310 receives a print execution instruction and disposable ACT from a main controller 300. The data conversion unit 311 executes, for example, rasterize processing according to an instruction from the print instruction receiving unit 310 to convert data into printable data in the digital MFP 20. The data sending unit 312 sends the printable data converted by the data conversion unit 311 to the digital MFP 20. The function restriction confirmation unit 313 sends an inquiry about the disposable ACT received by the print instruction receiving unit 310 to the digital MFP 20 to determine its validity.

The software configuration in the digital MFP 20 will be described below. A print setting management unit 420 in the device application 21 also manages restriction release conditions which are stored in a print setting storage unit 421 and are required to temporarily release a print function of the digital MFP 20 restricted by an administrator user. The print setting storage unit 421 stores the restriction release conditions associated with the print function. Note that the restriction release conditions which are registered by the administrator user in the device application 21 may include the same items as those in the device control system according to the first embodiment or may also include different items. This embodiment will explain a function associated with print processing as a target of a restriction release function set in the restriction release conditions. Processes in respective steps of the device control system according to the second embodiment of the present invention will be described in detail below with reference to FIGS. 21 to 23.

[Print Execution Processing]

Figure 21:
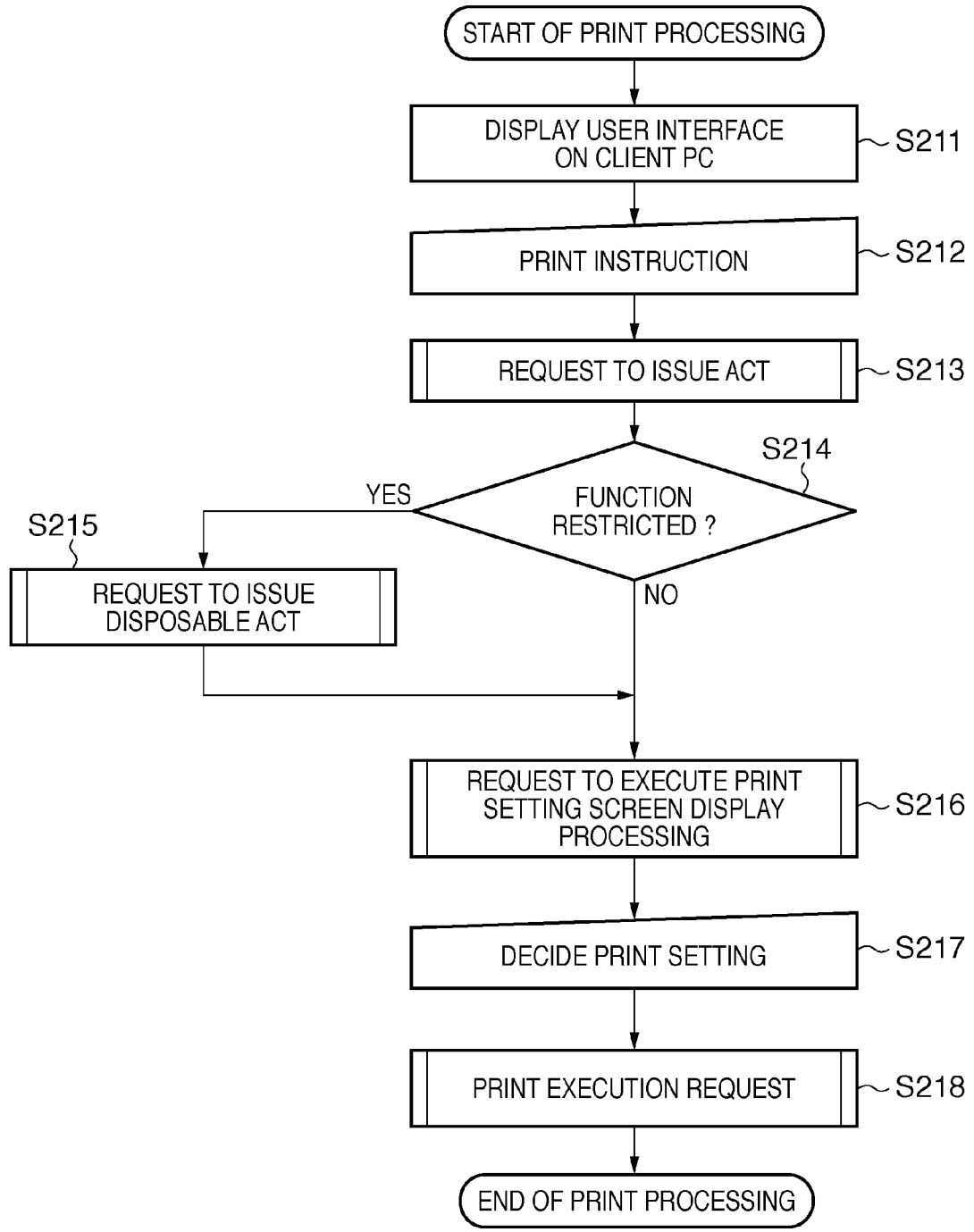
FIG. 21 is a flowchart showing an overview of the sequence of print execution processing of the device control system according to the second embodiment of the present invention.

User A executes print processing using the digital MFP 20 via the client application 11 and printer driver 12 in the Client PC 10 of the device control system according to the embodiment of the present invention. FIG. 21 is a flowchart showing an overview of the sequence of print execution processing. This processing will be described below using FIGS. 21 to 23.

In step S211, the client application 11 of the device control system according to the embodiment of the present invention is launched in response to an instruction from user A. The main controller 300 instructs an information display unit 301 to display a user interface of the client application 11 on a display 108 of the Client PC 10. Then, in step S212, an operation information acquisition unit 302, which accepted the print instruction from user A to the digital MFP 20 via the user interface displayed on the display 108 in step S211, sends that instruction to the main controller 300. In step S213, the main controller 300, which accepted the print instruction from user A in step S212, requests a request receiving unit 400 of the digital MFP 20 to acquire an ACT of user A.

The following description will be given taking as an example a case in which color print processing using the digital MFP 20 is restricted in the acquired ACT of user A. Since the ACT issuance processing is the same as that in the device control system according to the first embodiment, a description thereof will not be repeated in this embodiment. In step S214, a function restriction determination unit 304 analyzes the ACT acquired in step S213 and sends an inquiry about whether or not user A is restricted to execute any print function to the digital MFP 20. If it is determined that user A is restricted to execute any print function, the process advances to step S215; otherwise, the process advances to step S216. If it is determined in step S214 that user A is restricted to execute any print function, the main controller 300 requests the digital MFP 20 to issue a disposable ACT in step S215. Since the disposable ACT issuance processing is the same as that in the device control system according to the first embodiment, a description thereof will not be repeated in this embodiment. In this embodiment, a disposable ACT in which a function associated with print processing is released can be acquired. After that, the process advances to step S216.

In step S216, the main controller 300 passes the ACT acquired in steps S214 and S215 to the print instruction receiving unit 310 in the printer driver 12 to request it to display a print setting screen. The print instruction receiving unit 310 displays the print setting screen based on the received ACT. Print setting screen display processing in the digital MFP 20 will be described later with reference to FIG. 22. If it is determined in step S214 that user A is not restricted to execute the print functions, the main controller 300 requests the print instruction receiving unit 310 to display the print setting screen in step S216 but it need not pass the ACT acquired in step S213. If the main controller 300 does not pass the ACT, the function restriction confirmation unit 313 may acquire the ACT of user A from the digital MFP 20. In step S217, user A inputs and decides print settings via the print setting screen displayed in step S216. After user A decides the print settings in step S217, the data conversion unit 311 generates print data according to the settings of user A in step S218. The data sending unit 312 sends the print data to the request receiving unit 400 of the digital MFP 20 to request it to execute print processing. Print execution processing in the digital MFP 20 will be described later with reference to FIG. 23. With the aforementioned sequence, the print processing is executed.

[Print Setting Screen Display]

Figure 22:
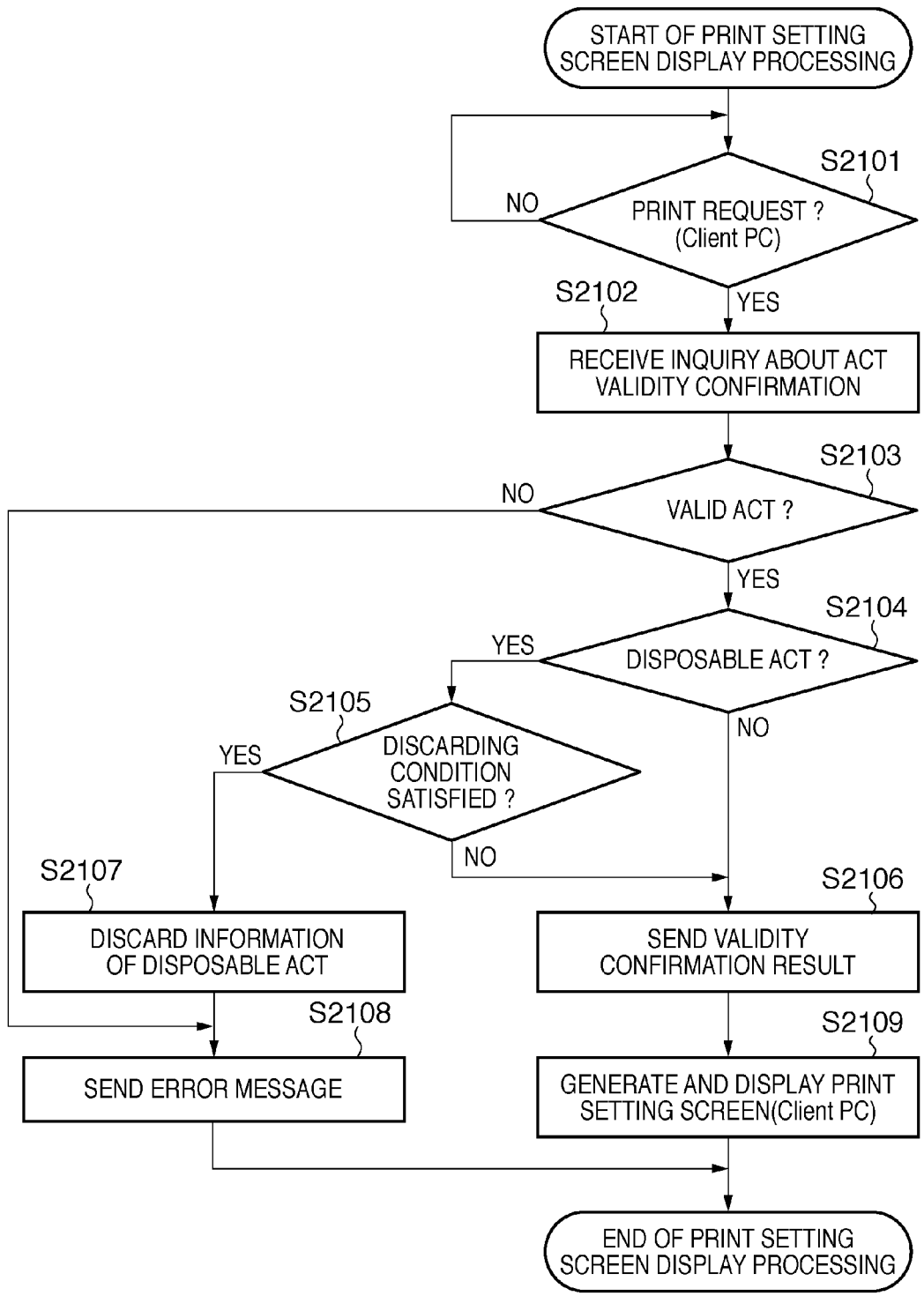
FIG. 22 is a flowchart showing the sequence of processing for displaying a print setting screen of the device control system according to the second embodiment of the present invention.

After the ACT required to execute the print processing using the digital MFP 20 is acquired in steps S214 and S215, user A displays the print setting screen of the printer driver 12 in the Client PC 10 of the device control system according to the embodiment of the present invention. FIG. 22 is a flowchart showing the sequence of the print setting screen display processing. This processing will be described in detail below with reference to FIGS. 22 and 23.

In step S2101, the main controller 300 sends a print request to the print instruction receiving unit 310. In this case, the main controller 300 passes the ACT or disposable ACT stored in a processing result storage unit 305 to the print instruction receiving unit 310 depending on the situation. After that, the process advances to step S2102. In step S2102, the request receiving unit 400 of the digital MFP 20 receives the ACT sent by the print instruction receiving unit 310 in step S2101 and determines the validity of the ACT. In step S2103, a function execution unit 401 passes the ACT received by the request receiving unit 400 to an authority management unit 404 to determine its validity. Note that the validity of the ACT is determined by checking whether or not the ACT was generated and issued by the authority management unit 404, whether or not a validity period since issuance has expired, and so forth. Note that the present invention is not limited to these items, and the validity of the ACT may be determined based on other kinds of information. If it is determined that the validity is confirmed, the process advances to step S2104; otherwise, the process jumps to step S2108. If it is determined in step S2103 that the validity of the ACT is confirmed, the function execution unit 401 instructs the authority management unit 404 to determine in step S2104 whether or not the ACT is a disposable ACT. More specifically, the authority management unit 404 determines if disposable ACT management information stored in an authority storage unit 405 includes the contents of the ACT. Note that when the ACT describes information indicating whether or not it is a disposable ACT, this determination process may be implemented based on that information. If it is determined that the ACT is a disposable ACT, the process advances to step S2105; otherwise, the process advances to step S2106. If it is determined in step S2104 that the ACT is a disposable ACT, the authority management unit 404 determines in step S2105 based on a valid usage count and validity period included in the disposable ACT management information whether or not a discarding condition is satisfied.

If it is determined that the discarding condition is satisfied, the process advances to step S2107. In step S2107, the authority management unit 404 deletes the disposable ACT from the disposable ACT management information, and stores the updated disposable ACT management information in the authority storage unit 405. After that, the process advances to step S2108 to return an error message to the Client PC 10. The Client PC 10 displays the received error message on the display 108. If it is determined in step S2105 that the discarding condition is not satisfied, the authority management unit 404 counts up the usage count of the disposable ACT management information to update the management information. Then, the process advances to step S2106. In step S2106, the function execution unit 401 returns the ACT validity confirmation result to the function restriction confirmation unit 313 via the request receiving unit 400. In step S2109, the print instruction receiving unit 310, which received the ACT validity confirmation result, generates a print setting screen in consideration of the function restrictions in the ACT received in step S2101, and displays it on the display 108. After that, this print setting screen display processing ends.

[Print Execution]

Upon reception of a print instruction from the printer driver 12 in the Client PC 10 of the device control system according to the embodiment of the present invention in step S217, the digital MFP 20 executes print processing. FIG. 23 is a flowchart showing the sequence of print processing in the digital MFP 20. This processing will be described in detail below with reference to FIG. 23.

The request receiving unit 400 determines in step S2201 whether or not the request received from the printer driver 12 of the Client PC 10 in step S217 is a print request. If it is determined that the request is a print request, the process advances to step S2202. In step S2202, the function execution unit 401 passes the ACT received by the request receiving unit 400 in step S2201 to the authority management unit 404 to determine its validity. Note that the validity of the ACT is determined by checking whether or not the ACT was generated and issued by the authority management unit 404, whether or not the validity period since issuance has expired, and so forth. Note that the present invention is not limited to these items, and the validity of the ACT may be determined based on other kinds of information. If it is determined that the validity is confirmed, the process advances to step S2203; otherwise, the process jumps to step S2208.

If it is determined in step S2202 that the validity of the ACT is confirmed, the function execution unit 401 instructs the authority management unit 404 to determine in step S2203 whether or not the ACT is a disposable ACT. More specifically, the authority management unit 404 determines if the disposable ACT management information stored in the authority storage unit 405 includes the contents of the ACT. Note that when the ACT describes information indicating whether or not it is a disposable ACT, this determination process may be implemented based on that information. If it is determined that the ACT is a disposable ACT, the process advances to step S2204; otherwise, the process advances to step S2205.

If it is determined in step S2203 that the ACT is a disposable ACT, the authority management unit 404 determines in step S2204 based on the validity period included in the disposable ACT management information whether or not the validity period has expired. If it is determined that the validity period has expired, the process advances to step S2208 to generate error information. After that, the process advances to step S2209. In step S2205, the print setting management unit 420 analyzes the print request received by the request receiving unit 400 in step S2201 in response to an instruction from the function execution unit 401. More specifically, the print setting management unit 420 determines whether or not the print request contents allow the digital MFP 20 to execute print processing. For example, this is the case when color print processing is set although the digital MFP 20 includes a monochrome printer, or when the received ACT includes a restricted print setting function.

If it is determined in step S2206 that print processing cannot be executed according to the print settings, the process advances to step S2208 to generate error information. After that, the process advances to step S2209. If it is determined that print processing can be executed according to the print settings, the process advances to step S2207. If it is determined in step S2206 that print processing can be executed according to the print settings, the function execution unit 401 instructs a print controller 205 to execute print processing in step S2207. Then, the function execution unit 401 determines in step S2209 whether or not the used ACT is a disposable ACT and is used up since print processing is normally complete. More specifically, the function execution unit 401 instructs the authority management unit 404 to determine whether or not the usage count of the disposable ACT management information after it is counted up has reached the upper limit of the valid usage count. If it is determined that the ACT is used up, the process advances to step S2210; otherwise, the process advances to step S2211. If it is determined in step S2209 that the disposable ACT is used up, the authority management unit 404 deletes the disposable ACT from the disposable ACT management information, and stores the updated disposable ACT management information in the authority storage unit 405 in step S2210. After that, the process advances to step S2211. In step S2211, the function execution unit 401 notifies the data sending unit 312 of the print processing result in steps S2207 and S2208 via the request receiving unit 400. With the above processing, the print execution processing ends.

According to the second embodiment of the present invention, the user can temporarily release the restriction of the print function, which is normally restricted, within the setting condition range of the administrator user when he or she uses a specific application. Then, the user can execute desired print processing using the digital MFP without bothering the administrator user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-097392, filed Apr. 13, 2009, which is hereby incorporated by reference herein in its entirety.

What is claimed is:

1. An image processing apparatus which imposes a usage restriction on a function included in said image processing apparatus according to access control information for each user, comprising:

a setting unit which sets a condition required to release a usage restriction of a function;

a determination unit which determines whether or not the condition required to release the usage restriction is satisfied when a request to use a usage-restricted function according to the access control information is received;

a generation unit which generates, when said determination unit determines that the condition required to release the usage restriction is satisfied, restriction release information required to temporarily release a restriction on the usage-restricted function;

a first issuance unit which issues the generated restriction release information as a response to the request;

an execution unit which releases, when the issued restriction release information and a processing request regarding the usage-restricted function are received, the restriction on the usage-restricted function according to the access control information, based on the restriction release information, and executes processing corresponding to the processing request by using the usage-restricted function; and a discarding unit which discards the restriction release information based on a discarding condition after said execution unit executes the processing, wherein the determination unit determines whether or not the condition is satisfied based on whether an application included in the request and the usage-restricted function match the condition.

2. The apparatus according to claim 1, further comprising a display unit which displays a function usable by each user, wherein
the function includes a registration function of a scan sending button, and
said execution unit registers the scan sending button on said display unit corresponding to the user based on the restriction release information.

3. The apparatus according to claim 1, wherein the function includes a print function.

4. The apparatus according to claim 1, further comprising a second issuance unit which issues access control information when a issuance request of the access control information is received, and wherein,
after said second issuance unit issues the access control information, said determination unit determines whether or not the condition required to release the usage restriction is satisfied depending on receiving the request to use the usage-restricted function according to the access control information,
said generation unit generates, when the condition required to release the usage restriction is satisfied, the restriction release information, and
said first issuance unit issues the generated restriction release information.

5. The apparatus according to claim 1, wherein the discarding condition is a condition designated by at least one of a validity period and a valid usage count of the restriction release information.

6. A method of controlling an image processing apparatus which imposes a usage restriction on a function included in the image processing apparatus according to access control information for each user, said method comprising:
a setting step of controlling a setting unit of the image processing apparatus to set a condition required to release a usage restriction of a function;
a determination step of controlling a determination unit of the image processing apparatus to determine whether or not the condition required to release the usage restriction is satisfied when a request to use a usage-restricted function according to the access control information is received;
a generation step of controlling a generation unit of the image processing apparatus to generate, when it is determined in said determination step that the condition required to release the usage restriction is satisfied, restriction release information required to temporarily release a restriction on the usage-restricted function;
a first issuance step of controlling a first issuance unit of the image processing apparatus to issue the generated restriction release information as a response to the request;
an execution step of controlling an execution unit of the image processing apparatus to release, when the issued restriction release information and a processing request regarding the usage-restricted function are received, the restriction on the usage-restricted function according to the access control information, based on the restriction release information, and to execute processing corresponding to the processing request by using the usage-restricted function; and
a discarding step of controlling a discarding unit of the image processing apparatus to discard the restriction release information based on a discarding condition after the processing is executed in said execution step,
wherein in said determination step, it is determined whether or not the condition is satisfied based on whether an application included in the request and the usage-restricted function match the condition.

7. A non-transitory computer-readable medium storing a program for making a computer function as:
a setting unit which sets a condition required to release a usage restriction of a function;
a determination unit which determines whether or not the condition required to release the usage restriction is satisfied when a request to use a usage-restricted function according to the access control information is received;
a generation unit which generates, when said determination unit determines that the condition required to release the usage restriction is satisfied, restriction release information required to temporarily release a restriction on the usage-restricted function;
a first issuance unit which issues the generated restriction release information as a response to the request;
an execution unit which releases, when the issued restriction release information and a processing request regarding the usage-restricted function are received, the restriction on the usage-restricted function according to the access control information, based on the restriction release information, and executes processing corresponding to the processing request by using the usage-restricted function; and
a discarding unit which discards the restriction release information based on a discarding condition after said execution unit executes the processing,
wherein the determination unit determines whether or not the condition is satisfied based on whether an application included in the request and the usage-restricted function match the condition.

* * * * *